US010064165B2

(12) United States Patent
Xu et al.

(10) Patent No.: US 10,064,165 B2
(45) Date of Patent: Aug. 28, 2018

(54) DOWNLINK AND UPLINK CHANNEL WITH LOW LATENCY

(71) Applicant: QUALCOMM Incorporated, San Diego, CA (US)

(72) Inventors: Hao Xu, San Diego, CA (US); Peter Gaal, San Diego, CA (US); Aleksandar Damnjanovic, Del Mar, CA (US); Wanshi Chen, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 14/866,465

(22) Filed: Sep. 25, 2015

(65) Prior Publication Data

US 2016/0100395 A1 Apr. 7, 2016

Related U.S. Application Data

(60) Provisional application No. 62/059,726, filed on Oct. 3, 2014, provisional application No. 62/059,831, filed on Oct. 3, 2014.

(51) Int. Cl.
*H04W 72/04* (2009.01)
*H04L 1/16* (2006.01)
*H04W 72/12* (2009.01)

(52) U.S. Cl.
CPC ....... *H04W 72/0413* (2013.01); *H04L 1/1607* (2013.01); *H04W 72/042* (2013.01); *H04W 72/0446* (2013.01); *H04W 72/1231* (2013.01)

(58) Field of Classification Search
CPC .................................................. H04W 72/042
See application file for complete search history.

(56) References Cited

U.S. PATENT DOCUMENTS

| | | | | |
|---|---|---|---|---|
| 2009/0175245 | A1* | 7/2009 | Harada | H04L 1/0007 370/336 |
| 2009/0245190 | A1* | 10/2009 | Higuchi | H04L 47/10 370/329 |
| 2013/0100900 | A1 | 4/2013 | Lee et al. | |

(Continued)

OTHER PUBLICATIONS

HTC: "E-PDCCH Design Considerations on Multiplexing with PDSCH", 3GPP Draft; R1-120266, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Feb. 6, 2012-Feb. 20, 2012, Feb. 1, 2012 (Feb. 1, 2012), XP050563176, [retrieved on Feb. 1, 2012].

(Continued)

*Primary Examiner* — Sulaiman Nooristany

(74) *Attorney, Agent, or Firm* — Anthony R. Morris

(57) ABSTRACT

Certain aspects of the present disclosure provide techniques that may be used to help enable low latency communications between a user equipment (UE) and a base station (BS) using quick uplink channels that enable a reduced transmission time interval (TTI). Additionally, certain aspects of the present disclosure provide techniques for managing communications in a wireless communication system, for example, by using enhanced downlink control channels.

26 Claims, 16 Drawing Sheets

(56) References Cited

U.S. PATENT DOCUMENTS

2013/0100934 A1     4/2013    Olsson et al.
2014/0071954 A1     3/2014    Au et al.

OTHER PUBLICATIONS

International Search Report and Written Opinion—PCT/US2015/052592—ISA/EPO—dated Mar. 8, 2016.

NTT DOCOMO et al., "Variable TTI Length Control", 3GPP Draft; R2-061921, 3rd Generation Partnership Project (3GPP), Mobile Competence Centre ; 650, Route Des Lucioles ; F-06921 Sophia-Antipolis Cedex ; France, vol. RAN WG2, No. Cannes, France; Jun. 22, 2006, Jun. 22, 2006 (Jun. 22, 2006), XP050141953, [retrieved on Jun. 22, 2006].

Partial International Search Report—PCT/US2015/052592—International Search Authority European Patent Office dated Dec. 14, 2015.

Research in Motion et al., "Design Consideration for E-PDCCH", 3GPP Draft; R1-113236(RIM-E-PDCCH Design), 3rd Generation Partnership Project (3GPP), Mobile Competence Centre; 650, Route Des Lucioles; F-06921 Sophia-Antipolis Cedex ; France, vol. RAN WG1, No. Zhuhai; Oct. 10, 2011, Oct. 4, 2011, XP050538352, [retrieved on Oct. 4, 2011].

Samsung: "Discussion on ePDCCH Design Issues", 3GPP Draft; R1-112517 EPDCCH, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Aug. 22, 2011, Aug. 16, 2011, XP050537597, [retrieved on Aug. 16, 2011].

\* cited by examiner

DOWNLINK AND UPLINK CHANNEL WITH LOW LATENCY

CLAIM OF PRIORITY UNDER 35 U.S.C. § 119

This application claims benefit of U.S. Provisional Patent Application Ser. Nos. 62/059,726, filed Oct. 3, 2014 and entitled "UPLINK CHANNEL WITH LOW LATENCY" and 62/059,831, filed Oct. 3, 2014 and entitled "ENHANCED DOWNLINK CONTROL CHANNEL DESIGN," both of which are herein incorporated by reference in their entirety.

BACKGROUND

I. Field

The present disclosure relates generally to communication systems, and more particularly, to enhanced downlink control channel designs for managing communications in a wireless communication system and quick uplink channels that enable a reduced transmission time interval (TTI) for low latency communications.

II. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, an eNodeB may receive data from a plurality of UEs over a shared uplink channel called the Physical Uplink Shared Channel (PUSCH). In addition, control information associated with the PUSCH may be transmitted to the eNodeB by the UE via a Physical Uplink Control Channel (PUCCH) and/or an Enhanced PUCCH (ePUCCH).

SUMMARY

Aspects of the present disclosure relate to enhanced downlink control channel designs for managing communications in a wireless communication system.

Certain aspects of the present disclosure provide a method for wireless communications. The method generally includes receiving, in a downlink subframe comprising two slots, at least one type of advanced physical downlink control channel (aPDCCH) from a base station (BS), and demodulating the aPDCCH based on a cell-specific reference signals (CRSs).

According to certain aspects, the CRSs span one or both of the two slots in the downlink subframe. In some cases, the method further includes receiving at least one Physical Downlink Shared Channel (PDSCH) in the downlink subframe and demodulating the PDSCH based on the CRS. Additionally, the method may include determining a starting symbol of the aPDCCH based on signaling from the BS.

In some cases, the aPDCCH is transmitted in a control channel region that spans the two slots of the downlink subframe. Additionally, in some cases, the downlink subframe also comprises a data channel region that spans the two slots of the downlink subframe for carrying Machine Type Communication (MTC) data traffic.

According to certain aspects, the aPDCCH comprises a quick physical downlink control channel (QPDCCH) having a single-slot transmission time interval (TTI) and the QPDCCH is transmitted in a control channel region that spans one slot of the downlink subframe. In some cases, the QPDCCH indicates resources, in the same one slot, for a quick physical downlink shared channel (QPDSCH). Additionally, in some cases, the control channel region spans all but a legacy control region of the one slot. According to certain aspects, the downlink subframe further comprises another control channel region that spans the two slots of the downlink subframe and a physical downlink shared channel (PDSCH) region that spans the two slots of the downlink subframe.

Certain aspects of the present disclosure provide an apparatus for wireless communications. The apparatus generally includes a memory coupled with at least one processor, wherein the at least one processor is configured to receive, in a downlink subframe comprising two slots, at least one type of advanced physical downlink control channel (aPDCCH) from a base station (BS), and demodulate the aPDCCH based on a cell-specific reference signals (CRSs).

Certain aspects of the present disclosure provide an apparatus for wireless communications. The apparatus generally includes means for receiving, in a downlink subframe comprising two slots, at least one type of advanced physical downlink control channel (aPDCCH) from a base station (BS), and means for demodulating the aPDCCH based on a cell-specific reference signals (CRSs).

Certain aspects of the present disclosure provide a non-transitory computer readable medium for wireless communications. The non-transitory computer readable medium generally includes instructions for receiving, in a downlink subframe comprising two slots, at least one type of advanced physical downlink control channel (aPDCCH) from a base station (BS), and demodulating the aPDCCH based on a cell-specific reference signals (CRSs).

Certain aspects of the present disclosure provide a method for wireless communications. The method generally includes transmitting, in a downlink subframe comprising two slots, at least one type of advanced physical downlink control channel (aPDCCH) to a user equipment, and transmitting cell-specific reference signals (CRS) in the downlink subframe for the UE to use for demodulating the aPDCCH.

According to certain aspects, in some cases, the CRS spans one or both of the two slots in the downlink subframe. In some cases, the aPDCCH occupies resources defined for demodulation reference signals (DMRS) in a legacy control channel when transmitting to certain types of UEs (e.g., MTC UEs).

According to certain aspects, the method further includes transmitting at least one Physical Downlink Shared Channel (PDSCH) in the downlink subframe to be demodulated by the UE based on CRS. In other aspects, the method includes signaling an indication of a starting symbol of the aPDCCH to the UE.

According to certain aspects, the aPDCCH is transmitted in a control channel region that spans the two slots of the downlink subframe. In some cases, the downlink subframe also comprises a data channel region that spans the two slots of the downlink subframe for carrying Machine Type Communication (MTC) data traffic According to certain aspects, the aPDCCH comprises a quick physical downlink control channel (QPDCCH) having a single-slot transmission time interval (TTI). In some cases, the aPDCCH is transmitted in a control channel region that spans one slot of the downlink subframe. Additionally, in some cases, the control channel region spans all but a legacy control region of the one slot.

According to certain aspects, in some cases, the QPDCCH indicates resources, in the same one slot, for a quick physical downlink shared channel (QPDSCH).

According to certain aspects, the downlink subframe further comprises another control channel region that spans the two slots of the downlink subframe and a physical downlink shared channel (PDSCH) region that spans the two slots of the downlink subframe.

Certain aspects of the present disclosure provide an apparatus for wireless communications. The apparatus generally includes a memory coupled with at least one processor, wherein the at least one processor is configured to transmit, in a downlink subframe comprising two slots, at least one type of advanced physical downlink control channel (aPDCCH) to a user equipment, and transmit cell-specific reference signals (CRS) in the downlink subframe for the UE to use for demodulating the aPDCCH.

Certain aspects of the present disclosure provide an apparatus for wireless communications. The apparatus generally includes means for transmitting, in a downlink subframe comprising two slots, at least one type of advanced physical downlink control channel (aPDCCH) to a user equipment, and means for transmitting cell-specific reference signals (CRS) in the downlink subframe for the UE to use for demodulating the aPDCCH.

Certain aspects of the present disclosure provide a non-transitory computer readable medium for wireless communications. The non-transitory computer readable medium generally includes instructions for transmitting, in a downlink subframe comprising two slots, at least one type of advanced physical downlink control channel (aPDCCH) to a user equipment, and transmitting cell-specific reference signals (CRS) in the downlink subframe for the UE to use for demodulating the aPDCCH.

Aspects of the present disclosure provide mechanisms for quick uplink channels that enable a reduced transmission time interval (TTI) for low latency communications.

Certain aspects of the present disclosure provide a method for wireless communications by a user equipment (UE). The method generally includes providing, to a base station, an indication that the UE is capable of supporting low latency communications through one or more quick uplink channels, wherein the one or more quick uplink channels enable a reduced transmission time interval (TTI) for the low latency communications having a shorter duration than a legacy TTI, and performing the low latency communications with the base station, using the one or more quick uplink channels, in accordance with the reduced TTI.

According to certain aspects, a duration of the legacy TTI corresponds to a duration of a subframe, wherein the subframe includes two time slots and the shorter duration of the reduced TTI corresponds to a duration of the time slots. In some cases, the UE is able to transmit a quick physical uplink control channel (QPUCCH) in one, but not both, of the two time slots.

According to certain aspects, performing the low latency communications comprises transmitting data in a first quick physical uplink shared channel (QPUSCH) in one of the time slots.

Additionally, in some cases, the method includes receiving an indication of whether the data transmitted in the first QPUSCH was successfully received by the base station in a quick physical downlink control channel (QPDCCH) transmitted from the base station in accordance with the reduced TTI. In some cases, the QPDCCH is received during a time slot a first number of subframes after the QPUSCH transmission in accordance with the reduced TTI. Additionally, in some cases, the indication in the QPDCCH indicates that the data transmitted in the first QPUSCH was not successfully received, and further comprising retransmitting the data in a second QPUSCH in a time slot a second number of subframes after receiving the indication in the QPDCCH in accordance with the reduced TTI.

Certain aspects of the present disclosure provide an apparatus for wireless communications by a user equipment (UE). The apparatus generally includes a memory coupled with at least one processor, wherein the at least one processor is configured to provide, to a base station, an indication that the UE is capable of supporting low latency communications through one or more quick uplink channels, wherein the one or more quick uplink channels enable a reduced transmission time interval (TTI) for the low latency communications having a shorter duration than a legacy TTI, and perform the low latency communications with the base station, using the one or more quick uplink channels, in accordance with the reduced TTI.

Certain aspects of the present disclosure provide an apparatus for wireless communications by a user equipment (UE). The apparatus generally includes means for providing, to a base station, an indication that the UE is capable of supporting low latency communications through one or more quick uplink channels, wherein the one or more quick uplink channels enable a reduced transmission time interval (TTI) for the low latency communications having a shorter duration than a legacy TTI, and means for performing the low latency communications with the base station, using the one or more quick uplink channels, in accordance with the reduced TTI.

Certain aspects of the present disclosure provide a non-transitory computer readable medium for wireless communications by a user equipment (UE). The non-transitory computer readable medium generally includes instructions for providing, to a base station, an indication that the UE is capable of supporting low latency communications through one or more quick uplink channels, wherein the one or more quick uplink channels enable a reduced transmission time interval (TTI) for the low latency communications having a shorter duration than a legacy TTI, and performing the low latency communications with the base station, using the one or more quick uplink channels, in accordance with the reduced TTI.

Certain aspects of the present disclosure provide a method for wireless communications by a base station (BS). The method generally includes receiving, from a user equipment (UE), an indication that the UE is capable of supporting low latency communications through one or more quick uplink channels, wherein the one or more quick uplink channels enable a reduced transmission time interval (TTI) for the low latency communications having a shorter duration than a legacy TTI and performing the low latency communications with the UE, using the one or more quick uplink channels, in accordance with the reduced TTI.

According to certain aspects, the method further includes participating in one or more procedures with the UE in accordance with the legacy TTI. In some cases, participating in the one or more procedures comprises at least one of: transmitting synchronization signals to aid in cell search, transmitting system information blocks (SIBs), participating in a random access channel (RACH) procedure, transmitting a paging message, or participating in an idle mode procedure.

According to certain aspects, the method further includes transmitting, to the UE, parameters for performing the low latency communications, in response to receiving the indication. In some cases, the parameters indicate at least one of time or frequency resources for the one or more quick uplink channels. Additionally, in some cases the parameters indicate a mapping of downlink transmissions to resources for use in acknowledging the downlink transmissions using the one or more quick uplink channels.

According to certain aspects, a duration of the legacy TTI corresponds to a duration of a subframe, wherein the subframe includes two time slots and the shorter duration of the reduced TTI corresponds to a duration of the time slots. In some cases, a first set of quick physical uplink control channel (QPUCCH) formats, for transmitting uplink control information, are supported in a first of the two time slots and a second set of QPUCCH formats are supported in a second of the two time slots, wherein the second set is a reduced subset of the first set. In some cases, at least some of the QPUCCH formats of the first and second sets are based on legacy physical uplink control channel (PUCCH) formats.

According to certain aspects, the method further includes allocating the UE a first set of resource blocks (RBs) for transmitting a quick physical uplink control channel (QPUCCH) in a first of the two time slots and allocating the UE a second set of RBs, different from the first set of RBs, for transmitting a QPUCCH in a second of the two time slots.

According to certain aspects, the UE is able to transmit a quick physical uplink control channel (QPUCCH) in one, but not both, of the two time slots.

According to certain aspects, performing the low latency communications comprises receiving data, from the UE, in a first quick physical uplink shared channel (QPUSCH) in one of the time slots.

According to certain aspects, the method further includes transmitting an indication of whether the data transmitted in the first QPUSCH was successfully received in a quick physical downlink control channel (QPDCCH) transmitted from the base station in accordance with the reduced TTI. In some cases, the QPDCCH is transmitted during a time slot a first number of subframes after the QPUSCH transmission in accordance with the reduced TTI.

According to certain aspects, the method further includes scheduling QPUSCH transmissions from the UE and legacy physical uplink shared channel (PUSCH) transmissions from a legacy UE such that resources used to acknowledge the QPUSCH and PUSCH transmissions do not collide.

According to certain aspects, the method further includes transmitting data in a quick physical downlink shared channel (QPDSCH) to the UE in accordance with the reduced TTI.

In some cases, performing low latency communications comprises receiving an indication of whether the QPDSCH transmission was successfully received in a quick physical uplink control channel (QPUCCH). Additionally, in some cases, the QPUCCH is received in a time slot a number of subframes after the QPDSCH transmission in accordance with the reduced TTI.

According to certain aspects, the method further includes scheduling QPDSCH transmissions to the UE and legacy physical downlink shared channel (PDSCH) transmissions to a legacy UE such that resources used to acknowledge the QPDSCH and PDSCH transmissions do not collide.

In some cases, performing the low latency communications comprises receiving at least one of a quick physical uplink shared channel (QPUSCH) or quick physical uplink control channel (QPUCCH) in one of the two time slots multiplexed with sounding reference signals (SRS).

Additionally, in some cases, performing the low latency communication comprises receiving a channel quality indicator (CQI) in a quick physical uplink shared channel (QPUSCH) in one of the two time slots.

Certain aspects of the present disclosure provide an apparatus for wireless communication. The apparatus generally includes a memory coupled with at least one processor, wherein the at least one processor is configured to: receive, from a user equipment (UE), an indication that the UE is capable of supporting low latency communications through one or more quick uplink channels, wherein the one or more quick uplink channels enable a reduced transmission time interval (TTI) for the low latency communications having a shorter duration than a legacy TTI, and perform the low latency communications with the UE, using the one or more quick uplink channels, in accordance with the reduced TTI.

Certain aspects of the present disclosure provide an apparatus for wireless communications. The apparatus generally includes means for receiving, from a user equipment (UE), an indication that the UE is capable of supporting low latency communications through one or more quick uplink channels, wherein the one or more quick uplink channels enable a reduced transmission time interval (TTI) for the low latency communications having a shorter duration than a legacy TTI and means for performing the low latency communications with the UE, using the one or more quick uplink channels, in accordance with the reduced TTI.

Certain aspects of the present disclosure provide a non-transitory computer-readable medium for wireless communications, comprising code for receiving, from a user equipment (UE), an indication that the UE is capable of supporting low latency communications through one or more quick uplink channels, wherein the one or more quick uplink channels enable a reduced transmission time interval (TTI) for the low latency communications having a shorter duration than a legacy TTI and performing the low latency communications with the UE, using the one or more quick uplink channels, in accordance with the reduced TTI.

DETAILED DESCRIPTION

Figure 1:
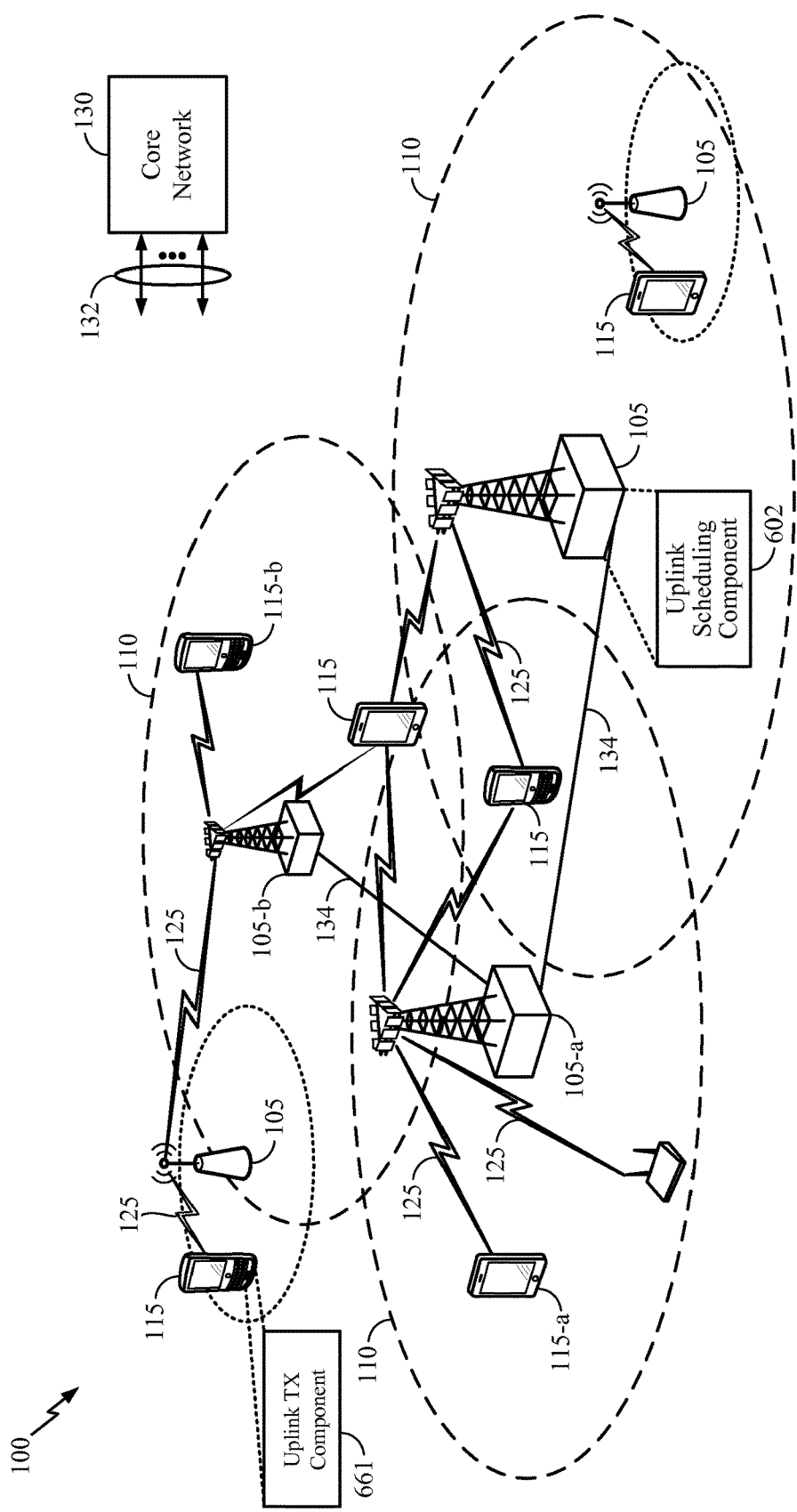
FIG. 1 shows a block diagram conceptually illustrating an example of a telecommunications system, in accordance with an aspect of the present disclosure.

Certain aspects of the present disclosure relate to an enhanced downlink control channel that may be used for managing machine type communications (MTC) and/or low latency (LL) communications. For LL, such a design may help reduce over-the-air latency by, for example, a factor of two while maintaining backward compatibility and co-existence with legacy devices.

Additionally, certain aspects of the present disclosure may help enable low latency communications between a user equipment (UE) and a base station (BS) using quick uplink channels that enable a reduced transmission time interval (TTI).

The techniques presented herein may help reduce latency as compared to legacy uplink transmission, using quick uplink data and control channels. For purposes of the present disclosure, any channel that may have a transmission time interval (TTI) of a single slot (or a portion of a single slot) may be referred to as a Quick channel. These Quick channels may include, in a non-limiting aspect, a Quick Physical Uplink Control Channel (QPUCCH), a Quick Enhanced Physical Uplink Control Channel (QEPUCCH), and a Quick Physical Uplink Shared Channel (QPUSCH). Furthermore, a Quick channel as described in the present disclosure may have one or more channels or resource element blocks that are or can be allocated, assigned, or divided on a per-slot basis and/or have a TTI of 0.5 ms.

Moreover, certain aspects of the present disclosure additionally implement frame scheduling of legacy channels (e.g., PDCCH, EPDCCH, PDSCH) alongside the Quick channel (e.g., QPUCCH, QEPUCCH, QPUSCH). The methods and apparatus described herein may be implemented for applications that are configured to utilize Quick channel scheduling and/or legacy scheduling. As the Quick LTE scheduling methods described herein may utilize a 0.5 ms TTI rather than the 1 ms TTI of legacy, these methods may increase communication rates and may cut a round-trip time (RTT) associated with legacy LTE hybrid automatic repeat request (HARQ) procedures in half (e.g., from 8 ms to 4 ms or less).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring first to FIG. 1, a diagram illustrates an example of a wireless communications system 100, in which aspects of the present disclosure may be performed, for example, to manage communications in the wireless communication system using enhanced downlink control channel to reduce transmission time interval (TTI) for low latency communications using quick uplink channels.

The wireless communications system 100 includes a plurality of access points (e.g., base stations, eNBs, or WLAN access points) 105, a number of user equipment (UEs) 115, and a core network 130. Access points 105 may include an uplink scheduling component 602 configured to expedite communication of control information and user data with the number of UEs 115 using a Quick LTE channel which may include a TTI of one slot for some RE blocks. Similarly, one or more of UEs 115 may include an uplink transmitter component 661 configured to transmit and operate using Quick LTE channel structure. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, an access point 105-a may acknowledge receipt of a transmission by providing ACK/NACK for the transmission through, for example, a HARQ scheme. Acknowledgments from the access point 105-a for transmissions in the first hierarchical layer may be provided, in some examples, after a predefined number of subframes following the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation (CA) to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined with other techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
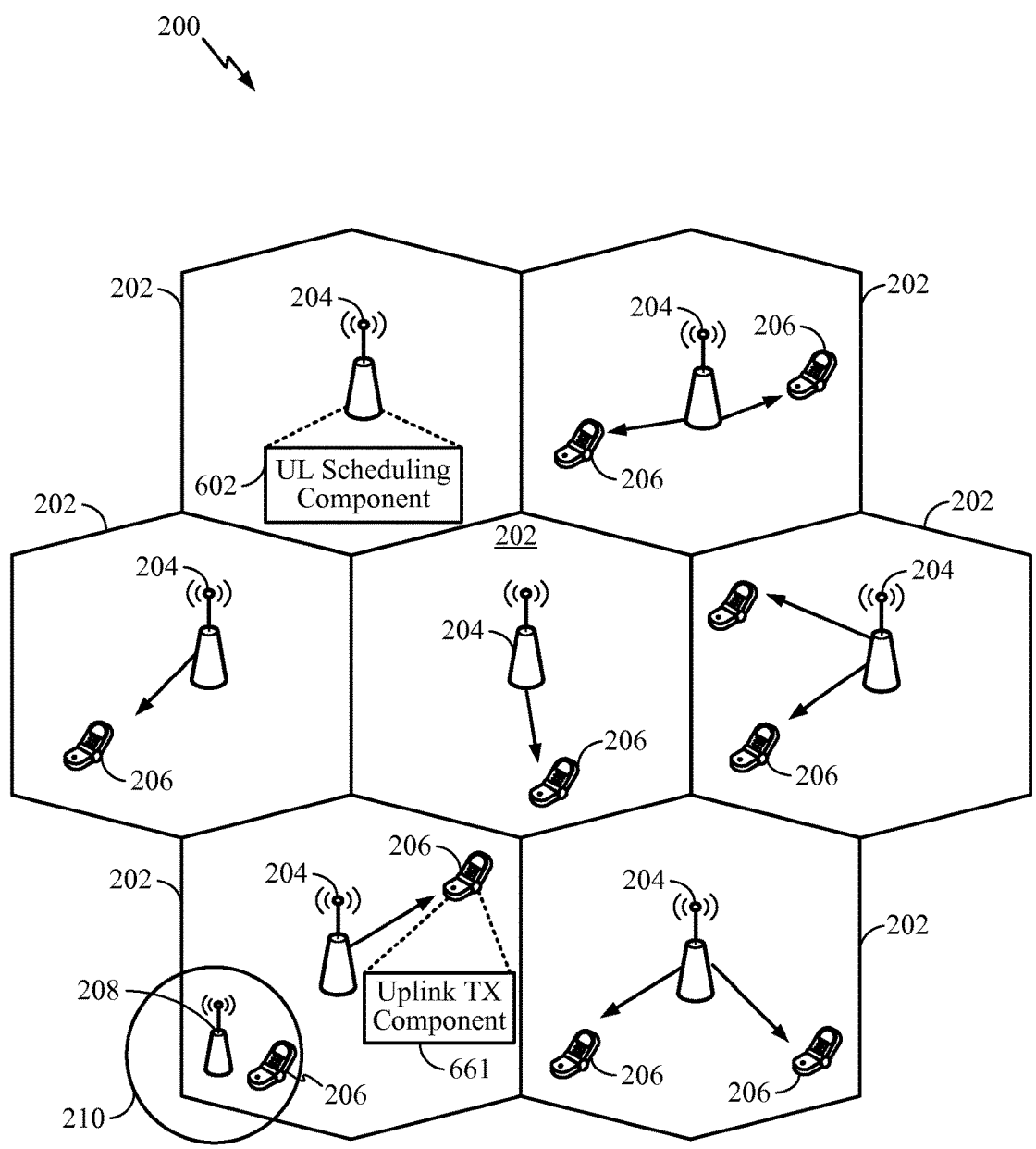
FIG. 2 is a diagram illustrating an example of an access network, in accordance with an aspect of the present disclosure.

FIG. 2 is a diagram illustrating an example of an access network 200 in an LTE network architecture, in which aspects of the present disclosure may be performed, for example, to manage communications in the wireless communication system using enhanced downlink control channel to reduce transmission time interval (TTI) for low latency communications using quick uplink channels.

In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include an uplink scheduling component 602 configured to expedite communication of control information and user data with the number of UEs 115 using an Quick LTE data structure, for example but not limited to the data structure provided in the downlink subframe structure 900 of FIG. 9, which may include a TTI of one slot for some RE blocks. Similarly, one or more of UEs 206 may include an uplink transmitter component 661 configured to transmit, decode and operate using the data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
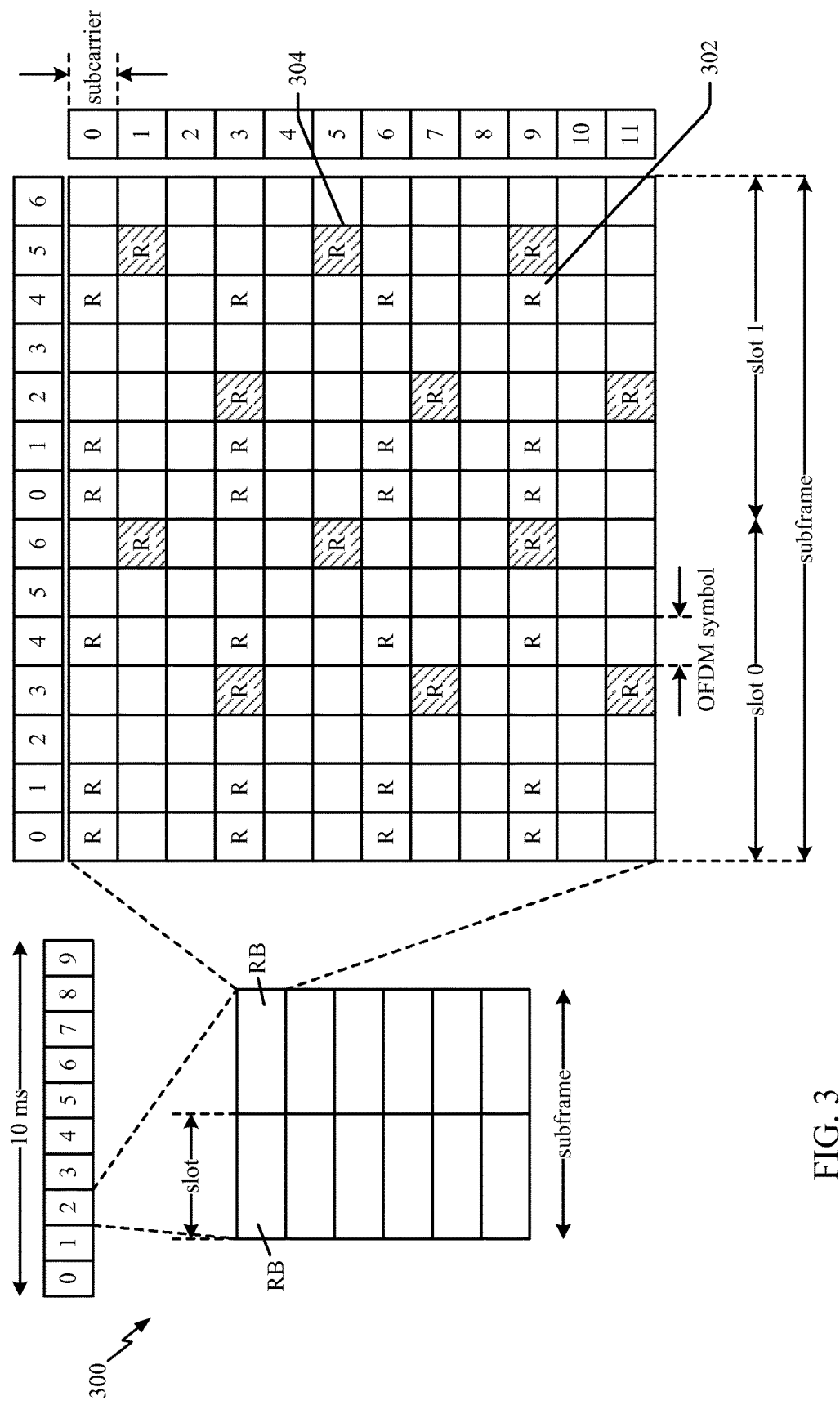
FIG. 3 is a diagram illustrating an example of a DL frame structure in LTE, in accordance with an aspect of the present disclosure.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
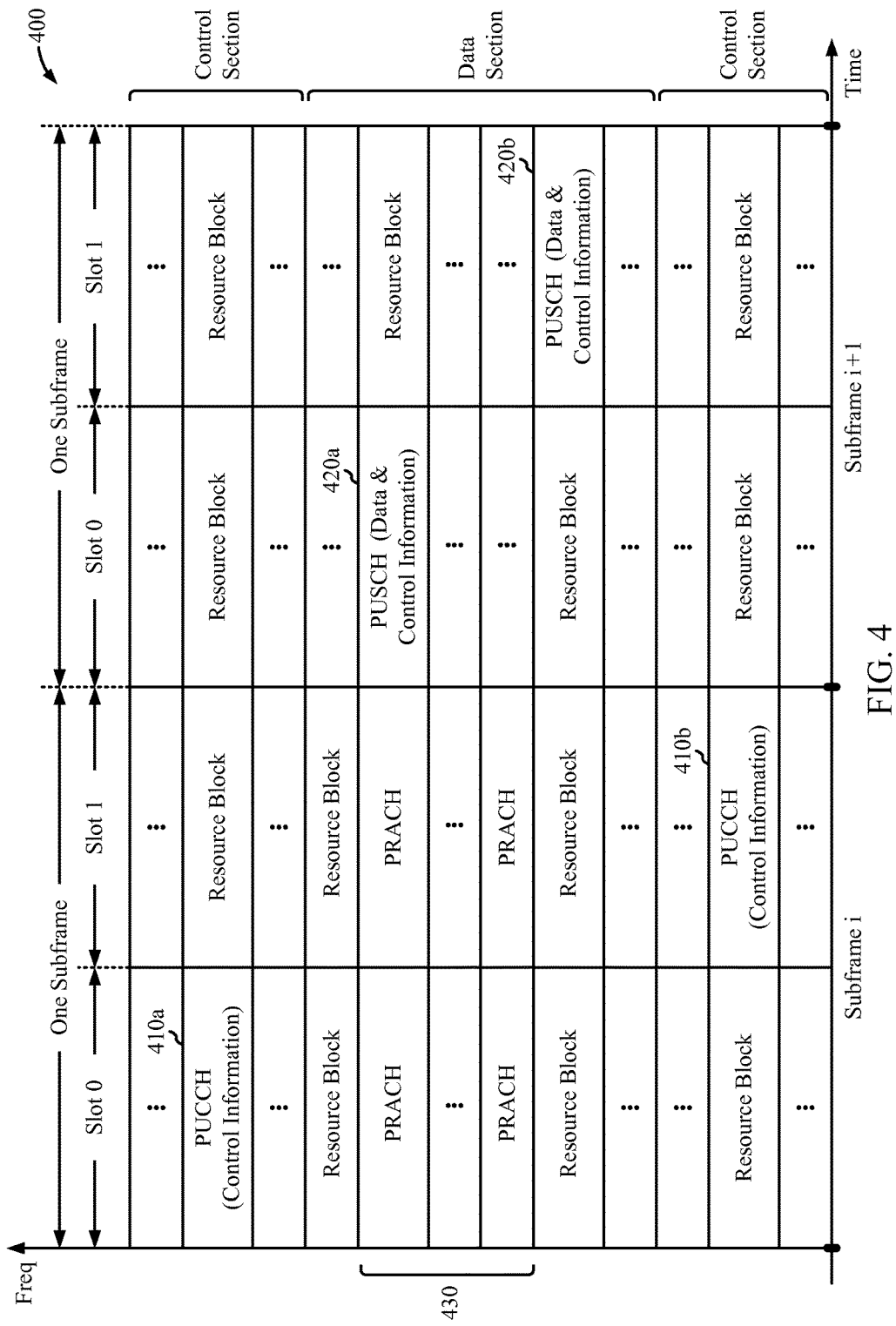
FIG. 4 is a diagram illustrating an example of an UL frame structure in LTE, in accordance with an aspect of the present disclosure.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410*a*, 410*b* in the control section to transmit control information to an eNB. The UE may also be assigned resource element blocks 420*a*, 420*b* in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms)

or in a sequence of few contiguous subframes and a UE can make only a single PRACH attempt per frame (10 ms).

Figure 5:
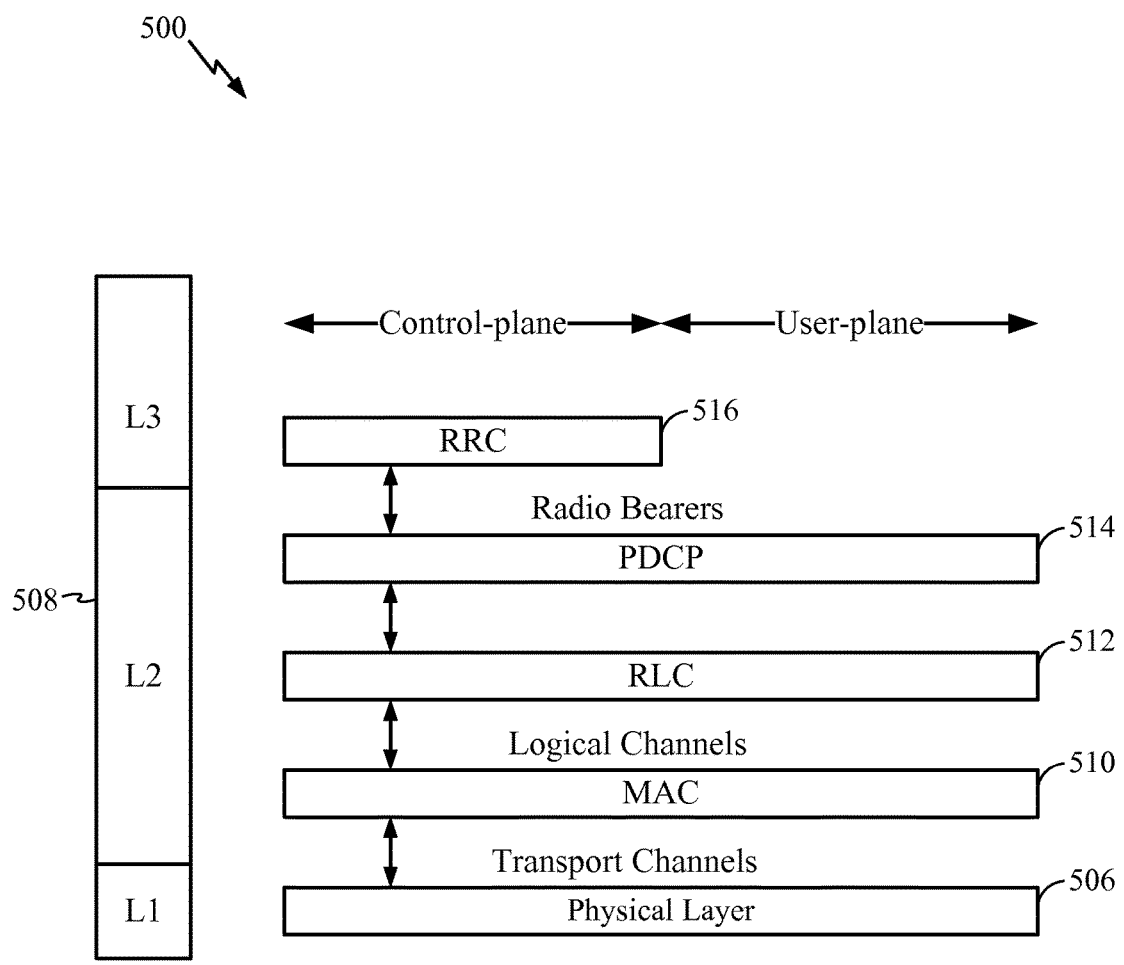
FIG. 5 is a diagram illustrating an example of a radio protocol architecture for the user and control planes, in accordance with an aspect of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
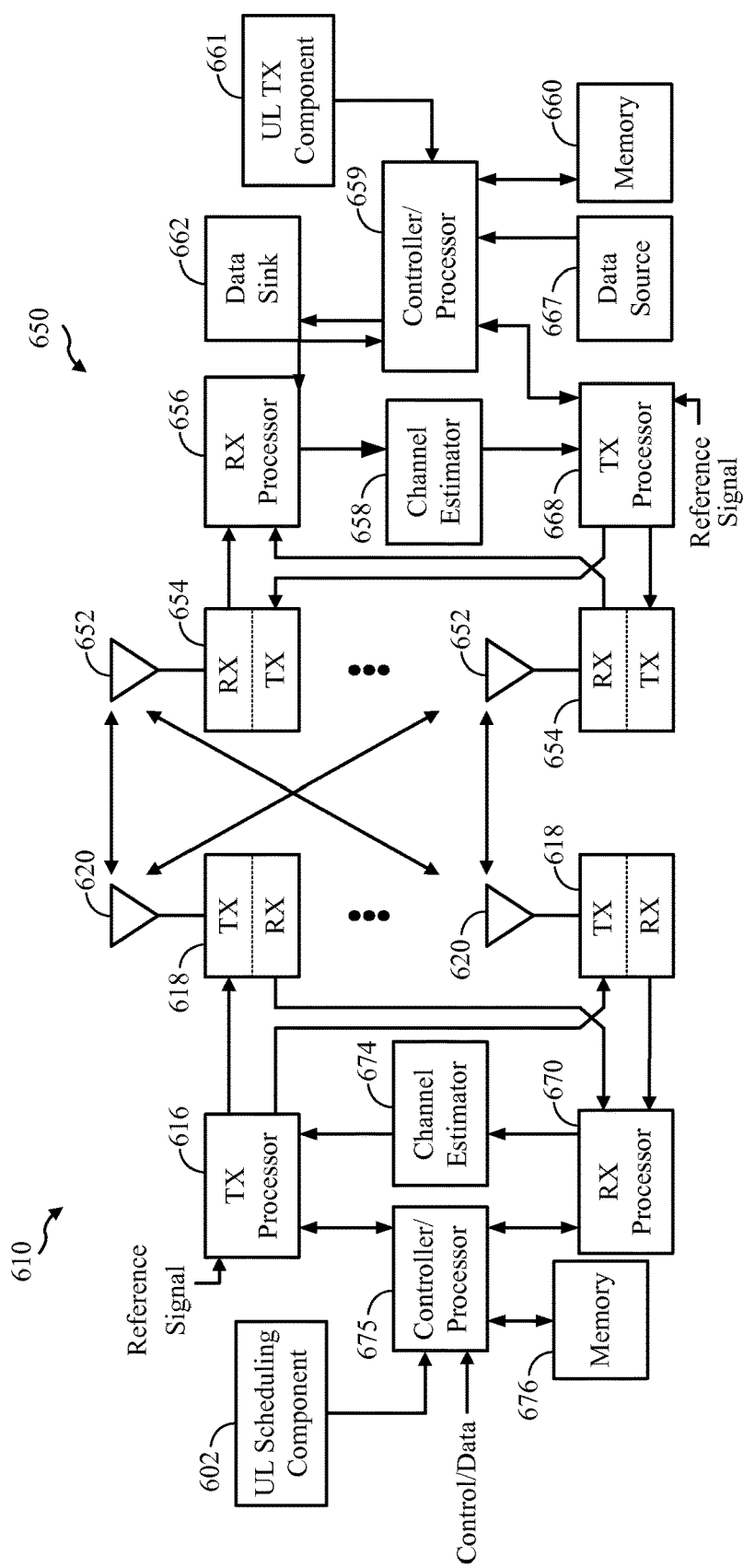
FIG. 6 is a diagram illustrating an example of an evolved Node B and user equipment in an access network, in accordance with an aspect of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an uplink scheduling component 602 configured to expedite communication of control information and user data with the number of UEs 115 according to certain aspects of the present disclosure.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include an uplink transmitter component 661 configured to receive, decode and operate using the data structure of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Enhanced Downlink Control Channel Design

Certain aspects of the present disclosure relate to an enhanced downlink control channel that may be used for managing machine type communications (MTC) and/or low latency (LL) communications. For LL, such a design may help reduce over-the-air latency by, for example, a factor of two while maintaining backward compatibility and co-existence with legacy devices.

A user equipment (UE) may comprise, be implemented as, or be known as an access terminal (AT), a subscriber station, a subscriber unit, a mobile station, a remote station, a remote terminal, a remote device, a wireless device, a device, a user terminal, a user agent, a user device, a user station, machine type communications (MTC) device or some other terminology. Examples of UEs include cellular phones (e.g., smart phones), tablets, laptops, netbooks, smartbooks, ultrabooks, navigation devices, camera devices, gaming devices, etc. Examples of MTC devices include various wireless sensors, monitors, detectors, meters, or other type data monitoring, generating, or relaying devices that may be expected to operate (possibly unattended) for years on a single battery charge.

Figure 7:
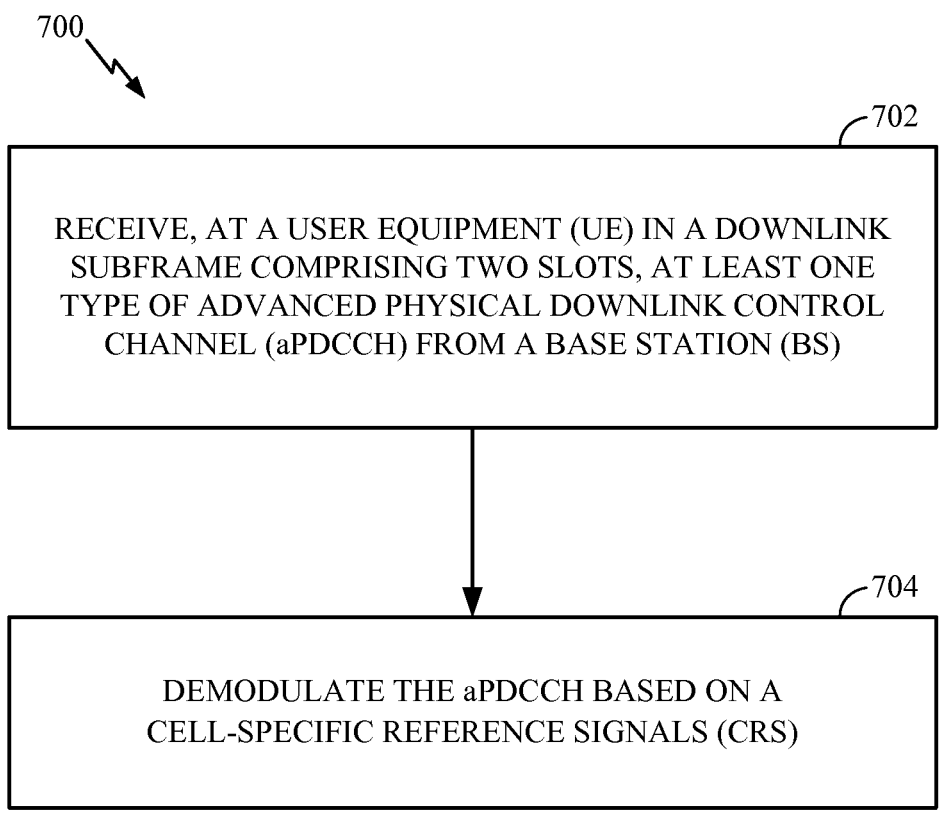
FIG. 7 illustrates a flow diagram of example operations for managing expedited user equipment (UE) communications at a UE, in accordance with certain aspects of the present disclosure.

FIG. 7 illustrates example operations 700 for wireless communications, in accordance with aspects of the present disclosure. The operations 700 may be performed, for example, by a user equipment, e.g., the user equipment 115 from FIG. 1, the user equipment 206 from FIG. 2, and/or the user equipment 650 from FIG. 6.

The operations 700 begin at 702 by receiving, at a UE, in a downlink subframe comprising two slots, at least one type of advanced physical downlink control channel (aPDCCH) from a base station (BS). According to certain aspects, the aPDCCH may include newer types of physical downlink control channel mechanisms, e.g., quick physical downlink control channel (QPDCCH), quick enhanced physical downlink control channel (QEPDCCH), etc. At 704, the user equipment demodulates the aPDCCH based on cell-specific reference signals (CRS).

Figure 8:
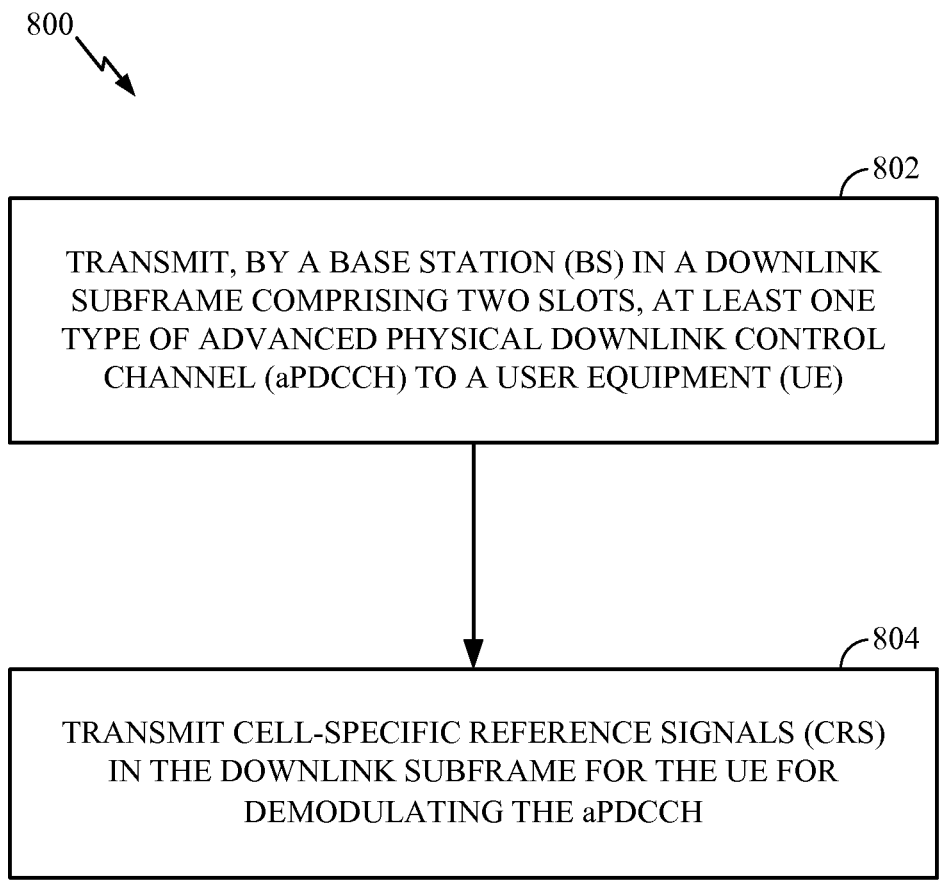
FIG. 8 illustrates a flow diagram of example operations for configuring and transmitting a downlink subframe to manage expedited communications, in accordance with certain aspects of the present disclosure.

FIG. 8 illustrates example operations 800 for wireless communications, in accordance with aspects of the present disclosure. The operations 800 may be performed, for example, by a base station, e.g., the access point 105 from FIG. 1, the eNB 204 from FIG. 2, and/or the eNB 610 from FIG. 6.

The operation 800 begin at 802 by transmitting, in a downlink subframe comprising two slots, at least one type of advanced physical downlink control channel (aPDCCH) to a user equipment. At 804, the base station may transmit cell-specific reference signals (CRS) in the downlink subframe for the UE to use for demodulating the aPDCCH.

One focus of the traditional Long Term Evolution (LTE) design is on the improvement of spectral efficiency, ubiquitous coverage, enhanced Quality of Service (QoS) support, and so on. This focus typically results in high-end devices, such as the state-of-art smart-phones, tablets, etc. However, low cost low rate devices may also need to be supported. For example, some market projections show that the number of low cost devices may largely exceed today's cell phones. Certain features have been explored in wireless systems, for example, reduction of maximum bandwidth, single receive radio frequency (RF) chain, reduction of peak rate, reduction of transmit power, half duplex operation, etc.

In many applications, coverage enhancement for MTC devices may be desirable. In addition to low cost requirement, 15-20 dB coverage enhancement may be needed to cover devices in a low coverage scenario (e.g., in a basement). In order to meet these requirements, large TTI bundling is proposed to achieve 15-20 dB link budget gain. On the DL, TTI bundling has been proposed for Physical Broadcast Channel (PBCH), PDCCH/EPDCCH, Physical Hybrid-ARQ Indicator Channel (PHICH), and Physical Downlink Shared Channel (PDSCH). On the UL, TTI bundling has been proposed for Random Access Channel (RACH), Physical Uplink Control Channel (PUCCH), and Physical Uplink Shared Channel (PUSCH).

For MTC, narrowband operation is considered for the LTE Rel. 13 where only six resource blocks (RBs) are used in RF and baseband processing. With this requirement, the current PDCCH design may not be used, as it spans the entire band. EPDCCH can be used, but it becomes very inefficient. For low latency LTE design, one slot based QEPDCCH is considered. Similarly, the current Demodulation Reference Signal (DMRS) based design is not efficient.

For complexity reduction, narrowband operation of six RBs is proposed for MTC communications. There are two control channel structures considered for MTC, however, there are issues with both of the approaches. In a first approach, PDCCH-like control channel may be employed with Time Division Multiplexing (TDM) control in time domain, and Cell-specific Reference Signal (CRS) based demodulation. Since the PDCCH spans the entire bandwidth, new design needs to be considered for MTC. In a second approach, EPDCCH-like control channel may be utilized with Frequency Division Multiplexing (FDM) control, and DMRS based demodulation. However, since both DMRS and CRS are present, the overhead may be significant.

In accordance with aspects of the present disclosure, the low latency (LL) PHY design objective may be to reduce over-the-air LTE latency by a factor of two, e.g., from 8 ms RTT to 4 ms RTT with minimal specification and implementation impact. In addition, backward compatibility and co-existence with legacy LTE devices (i.e., non-MTC devices) may be maintained.

In accordance with aspects of the present disclosure, a key technical solution may be based on enhanced data communications with 0.5 ms TTI, wherein the LL channel may be based on EPDCCH/PDSCH/PUCCH/PUSCH slot structure. Similarly, there are two options for the control channel structure.

In an aspect, LL DL control channel design may be based on a PDCCH-based Quick DL Control Channel (QPDCCH). The legacy control region may be used in slot 0 for scheduling data. The QPDCCH may reuse a PDCCH Control Channel Element (CCE) structure and be fully multiplexed with other legacy control channels. New downlink control information (DCI) may be needed to indicate slot based versus subframe based assignment. This approach may allow HARQ RTT of, for example, 4 ms with slot based data communications. In the DL, QPDCCH may schedule slot 0 QPDSCH in a subframe n, and in the UL, QPDCCH may schedule slot 0 QPUSCH in a subframe n+2.

In another aspect, a LL DL control channel design may be based on an EPDCCH-based Quick DL Control Channel (QEPDCCH). In this case, the current EPDCCH may be simply split into two slots. The same Enhanced Control Channel Element (ECCE) resources may be present in each slot as the current EPDCCH. Simpler multiplexing with legacy EPDCCH may be achieved as well as across different LL users. The aggregation level may be increased by approximately two times to maintain similar coverage, which may be similar to the current EPDCCH design for special subframes with short duration. This approach may support both distributed and localized formats, and both DL and UL grants.

Figure 9:
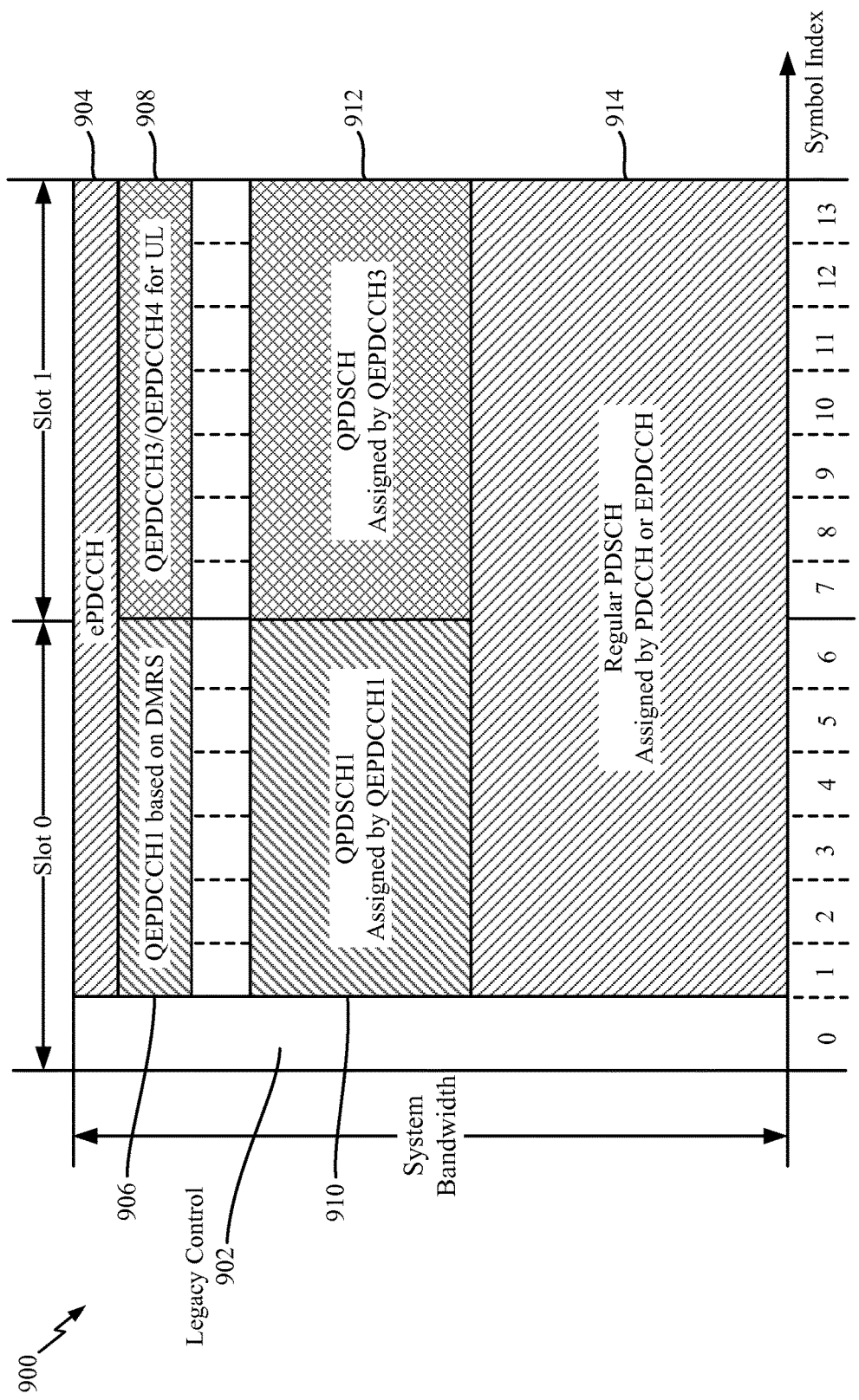
FIG. 9 illustrates an example of a downlink frame structure for managing expedited UE communications in a wireless communication system, in accordance with aspects of the present disclosure.

FIG. 9 is illustrates an example of a downlink subframe structure 900 for managing expedited UE communications in a wireless communication system, in accordance with aspects of the present disclosure. In an aspect of the present disclosure, the downlink subframe structure 900 may comprise a slot-based downlink channel PDCCH. In an aspect, the slot-based PDCCH may be divided in the time domain (horizontally) into two slots (e.g., slot 0 and slot 1). Furthermore, the temporal duration (horizontal axis) of some resource element blocks of the slot-based PDCCH may be one slot (0.5 ms TTI). As such, by incorporating control and data channel resource element blocks having a TTI of one slot (0.5 ms), the downlink channel as illustrated in FIG. 9 allows for lower latency for downlink transmissions relative to, for example, resource element blocks of legacy LTE, which may have a downlink resource element block TTI of one subframe (1 ms).

As illustrated in FIG. 9, the slot-based downlink channel may comprise a legacy control region 902 for scheduling legacy devices that includes every resource element of symbol 0. The slot-based downlink channel illustrated in FIG. 9 may further comprise an ePDCCH 904 spanning each of the slots 0 and 1 (e.g., from symbols 1 to 13). Moreover, the slot-based downlink channel from FIG. 9 may comprise QEPDCCH1 906 based on DMRS in slot 0 (e.g., from symbols 1 to 6), and QEPDCCH3/QEPDCCH4 908 with an uplink resource grant for a UE receiving the subframe 900. As shown, QEPDCCH3/QEPDCCH4 908 may span symbols 7 to 13 of slot 1.

As illustrated in FIG. 9, the slot-based downlink channel may comprise the downlink data channel grant QPDSCH1 910 assigned by QEPDCCH1 906 in slot 0 (e.g., from symbols 1 to 6), and the downlink data channel grant QPDSCH 912 assigned by QEPDCCH3 908 in slot 1 (e.g., from symbols 7 to 13). In addition, as illustrated in FIG. 9, the slot-based downlink channel may comprise one or more legacy downlink channels (e.g., regular PDSCH 914) having a two-slot TTI assigned by a control region (e.g., assigned by PDCCH or EPDCCH).

In some cases, there may be certain issues to address for LL devices. For example, for the slot based QEPDCCH design, the DMRS in a slot may not be sufficient for demodulation. However, increasing the DMRS density may lead to a large overhead as the available resources are already reduced by half.

Additionally, there are also certain issues for MTC devices to be resolved. For example, an MTC device may rely on CRS to decode physical broadcast control channel (PBCH), so CRS processing may need to be supported. For EPDCCH processing, relying on just DMRS may not be sufficient especially for the coverage limited users.

Certain aspects of the present disclosure present an enhanced DL control channel structure for both MTC and low latency (LL) with 0.5 ms TTI. The enhanced control channel may have an FDM structure similar to EPDCCH and may use CRS, instead of DRMS, for demodulation. Thus, since CRS is used for demodulation, a UE can perform longer averaging to improve channel estimation. Additionally, since DRMS is not used, more resources can be used to transmit data tones.

Aspects of the present disclosure present new control channel, referred to as a Machine type communication PDCCH (e.g., MPDCCH), for MTC. This control channel may span the entire subframe except, for example, for a legacy control region. The starting symbol may be signaled through System Information (SI), Radio Resource Control (RRC), dynamically, or fixed by a wireless communication standard. As discussed above, DMRS may not be transmitted in this new DL control channel design. Thus, enhanced control channel elements (ECCEs) may also occupy the resources that are defined for EPDCCH DMRS, which may reduce overhead and improve coding for data. In an aspect of the present disclosure, demodulation may rely solely on CRS. This may provide longer averaging for channel estimation enhancements, as noted above.

With this new control channel design, MTC may rely on CRS for demodulation for PBCH and MPDCCH. For PDSCH, the support for only CRS based demodulations may be further restricted. Thus, the MTC UE does not need to perform any DMRS based demodulation, which provides complexity savings.

Figure 10:
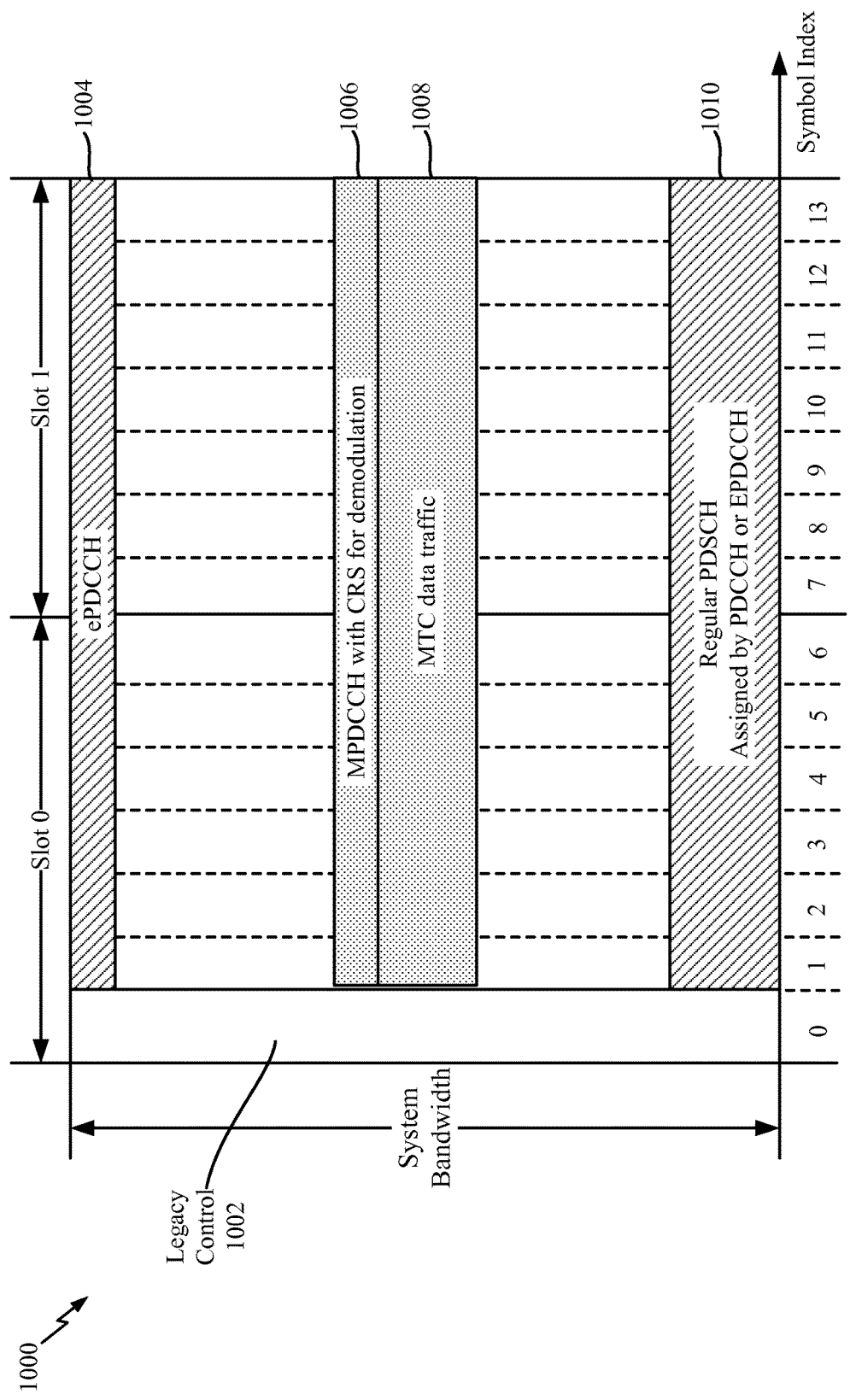
FIG. 10 illustrates an example of a downlink frame structure for managing machine type communications (MTC), in accordance with aspects of the present disclosure.

FIG. 10 illustrates an example of an enhanced downlink subframe structure 1000 for managing machine type communications (MTC), in accordance with aspects of the present disclosure. The downlink subframe structure 1000 may be divided in time domain into two slots (e.g., slot 0 and slot 1), each slot lasting, for example, 0.5 ms. As illustrated in FIG. 10, the downlink subframe structure 1000 may comprise a legacy control region 1002 for scheduling that includes every resource element of a symbol of slot 0, and it may further comprise ePDCCH 1004 spanning each of the slots 0 and 1. In an aspect, ePDCCH/QPDCCH/QEPDCCH may utilize both CRS and DMRS for demodulation.

As illustrated in FIG. 10, the downlink subframe structure 1000 may comprise a Machine type communication Physical Downlink Control Channel (MPDCCH) with CRS for demodulation 1006, which may span both slots 0 and 1. As illustrated in FIG. 10, the downlink subframe structure 1000 may further comprise MTC data traffic 1008, which may also span both slots 0 and 1. In addition, as illustrated in FIG. 10, the downlink subframe structure 1000 may comprise one or more legacy downlink channels (e.g., regular PDSCH 1010) having a two-slot TTI assigned by a control region (e.g., assigned by PDCCH or EPDCCH).

Aspects of the present disclosure also present a new control channel for LL (e.g., QEPDCCH). According to certain aspects, for LL, the QEPDCCH may span a single slot (as opposed to an entire subframe) except for the legacy control region in slot 0.

Figure 11:
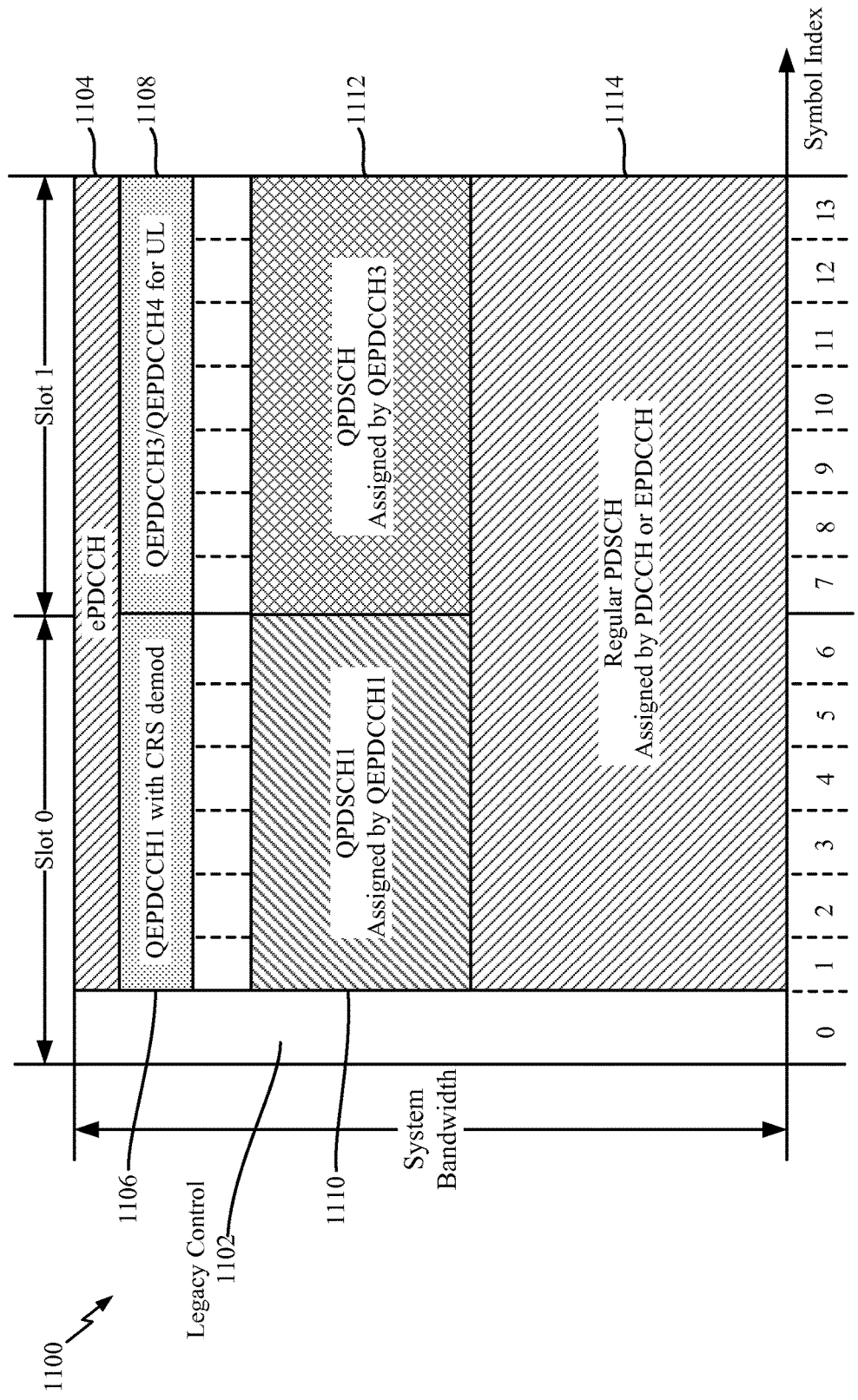
FIG. 11 illustrates an example of a downlink frame structure for managing Low Latency (LL) communications, in accordance with aspects of the present disclosure.

FIG. 11 illustrates an example of a downlink subframe structure 1100 for Low Latency (LL) communications, in accordance with aspects of the present disclosure. For example, the downlink subframe structure 1100 may be divided in time domain into two slots (e.g., slot 0 and slot 1), each slot lasting, for example, 0.5 ms. As illustrated in FIG. 11, the downlink subframe structure 1100 may comprise a legacy control region 1102 for scheduling legacy UEs and may include every resource element of a symbol 0 of slot 0. Additionally, as illustrated, the DL subframe structure may further comprise an ePDCCH 1104 spanning each of the slots 0 and 1.

As illustrated in FIG. 11 and in accordance with aspects of the present disclosure, the downlink subframe structure 1100 may comprise QEPDCCH1 1106 with CRS for demodulation in slot 0 and QEPDCCH3/QEPDCCH4 1108 with an uplink resource grant in slot 1 for a user equipment receiving the subframe 1100. In an aspect, at least one of QEPDCCH1 1106, QEPDCCH3 1108, or QEPDCCH4 1108 may utilize both CRS and DMRS for demodulation.

As illustrated in FIG. 11, the downlink subframe structure 1100 may further comprise the downlink data channel grant QPDSCH1 1110 assigned by QEPDCCH1 1106 in slot 0, and the downlink data channel grant QPDSCH 1112 assigned by QEPDCCH3 1108 in slot 1. In addition, as illustrated in FIG. 11, the downlink subframe structure 1100 may comprise one or more legacy downlink channels (e.g., regular PDSCH 1114) having a two-slot TTI assigned by a control region (e.g., assigned by PDCCH or EPDCCH).

According to certain aspects, the starting symbol for the QEPDCCH (e.g., QEPDCCH1 1106) may be signaled dynamically, fixed by a wireless communication standard, or by using System Information (SI) and/or Radio Resource Control (RRC). As discussed above, CRS may be transmitted and used for demodulation instead of DRMS. Thus, ECCEs may also occupy the resources that are defined for EPDCCH DMRS. According to certain aspects, except for not transmitting DMRS, the design of the QEPDCCH may follow the same as EPDCCH, e.g., regarding ECCE, aggregation level, etc. In an aspect, demodulation may rely solely on CRS, which may provide longer averaging for channel estimation enhancements. Additionally, the LL device has more flexibility to improve channel estimation for the critical low latency communications, which may only have impact on the device power consumption, as the latency for data communications at least stays the same.

Example Low Latency Uplink Channel Design

As noted above, aspects of the present disclosure may help enable low latency communications between a user equipment (UE) and a base station (BS) using quick uplink channels that enable a reduced transmission time interval (TTI).

For example, certain aspects of the present disclosure provide techniques that may help reduce over-the-air latency in LTE systems by a factor of 2 (e.g., from 8 ms round trip time (RTT) to 4 ms), while maintaining backward compatibility and co-existence with legacy LTE devices (e.g., devices that do not support the low latency communications described herein).

According to certain aspects, low latency communications may be enabled by using reduced transmission time intervals (TTIs) relative to legacy TTIs (i.e., TTIs used for legacy devices). For example, in some cases, a 0.5 ms TTI may be used for a low latency (LL) channel based on a physical downlink control channel (PDCCH), enhanced PDCCH (ePDCCH), PDSCH, PUCCH, and/or PUSCH slot structure. That is, for a 0.5 ms TTI, the LL channel may be based on time slots rather than subframes (assuming an LTE subframe that includes 2 time slots of 0.5 ms each). In some cases, low latency communications may be achieved using a different approach, for example, with a (conventional LTE) 1 ms TTI, but with tightened processing requirements and timing advance (TA) restriction to allow 2 ms HARQ turnaround time instead of 4 s.

In some cases, in order to support 0.5 ms TTI bundling within the current LTE system with backward compatibility and integration with other users, a device capable of supporting reduced TTIs may be required to perform certain procedures (e.g., cell search, SIB reading, RACH procedure, paging, and idle mode procedure) according to a legacy 1 ms subframe structure.

According to certain aspects, a UE operating according to LL data communications (e.g., operating using 0.5 ms subframe structure) may indicate LL capability to a serving eNB during or after connection setup. In response, the eNB may provide configuration information (e.g., LL parameters, such as channel locations, starting CCE, etc.) for DL/UL channels. In some cases, the LL parameters may include time (e.g., time instances) and/or frequency resources for LL channels (e.g., quick physical uplink control channel, QPUCCH, and quick physical uplink shared channel, QPUSCH). Additionally, the LL parameters may also indicate a starting symbol for a DL data channel (e.g., quick enhanced physical downlink shared channel, QEPDSCH) and a DL control channel (e.g., Quick Enhanced Physical Downlink Control Channel, QEPDCCH). The LL parameters may also indicate new resources allocated for QPUCCH acknowledgement (ACK) which, as will be described in greater detail below, may be different than a regular (i.e., legacy) PUCCH ACK. The parameters may also provide a new mapping rule for LL communications, indicating a mapping of resources that is different than the mapping used for legacy communications, for example, for indicating the use of different resources from the legacy mapping).

According to certain aspects, the LL parameters may be broadcast (e.g., in a system information block, SIB), provided through a radio resource control (RRC) message(s), and/or signaled using dynamic signaling by an eNB.

Figure 12:
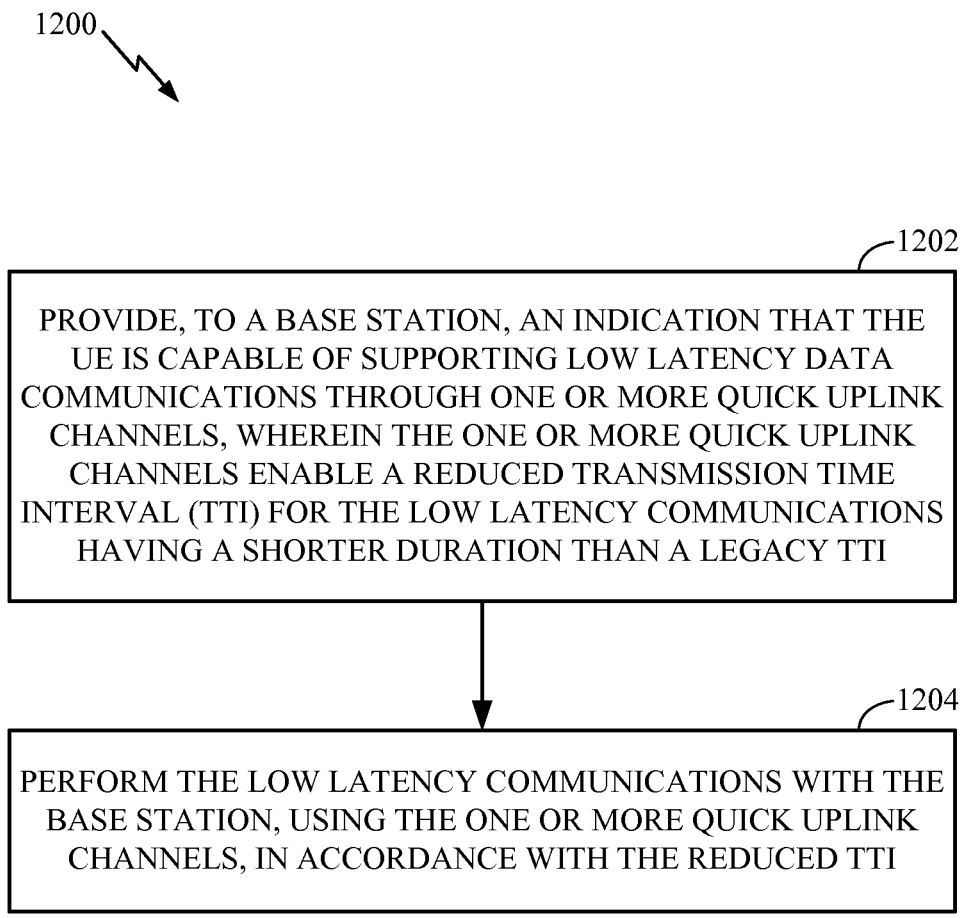
FIG. 12 illustrates example operations for wireless communications by a user equipment (UE), in accordance with aspects of the present disclosure.

FIG. 12 illustrates example operations 1200 for low latency wireless communications, in accordance with aspects of the present disclosure. The operations 1200 may be performed, for example, by a user equipment (UE) capable of supporting reduced TTIs (e.g., as compared to legacy UEs). For example, operations 1200 may be performed by the user equipment 115 from FIG. 1, the user equipment 206 from FIG. 2, and/or the user equipment 650 from FIG. 6.

Operations 1200 begin, at 1202, by providing, to a base station, an indication that the UE is capable of supporting low latency communications through one or more quick uplink channels, wherein the one or more quick uplink channels enable a reduced transmission time interval (TTI) for the low latency communications having a shorter duration than a legacy TTI. At 1204, the UE performs the low latency communications with the base station, using the one or more quick uplink channels, in accordance with the reduced TTI.

Figure 13:
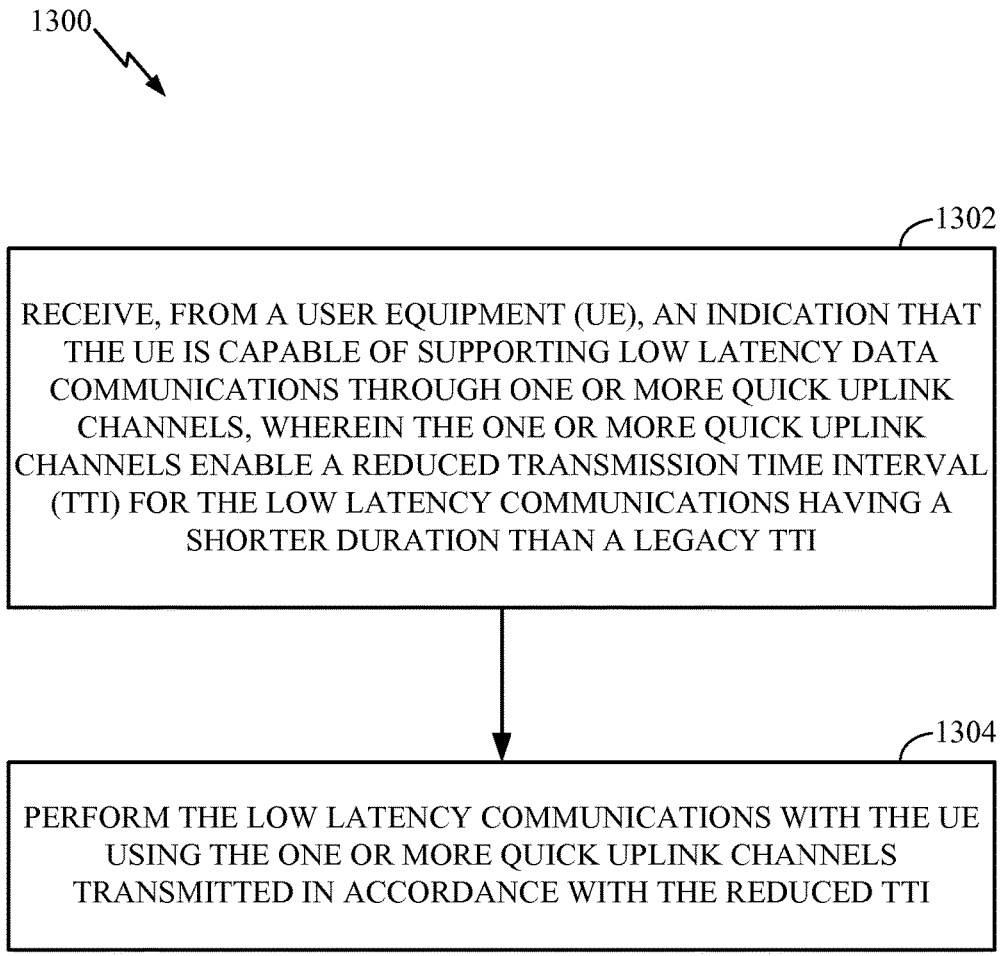
FIG. 13 illustrates example operations for wireless communications by a base station (BS), in accordance with aspects of the present disclosure.

FIG. 13 illustrates example operations 1300 for low latency wireless communications, in accordance with aspects of the present disclosure. The operations 1300 may be performed, for example, by a base station capable of supporting reduced TTIs. For example, the operations 1300 may be performed by the access point 105 from FIG. 1, the eNB 204 from FIG. 2, and/or the eNB 610 from FIG. 6.

The operations 1300 begin, at 1302, by receiving, from a user equipment (UE), an indication that the UE is capable of supporting low latency communications through one or more quick uplink channels, wherein the one or more quick uplink channels enable a reduced transmission time interval (TTI) for the low latency communications having a shorter duration than a legacy TTI. At 1304, the base station performs the low latency communications with the UE using the one or more quick uplink channels transmitted in accordance with the reduced TTI.

Figure 14:
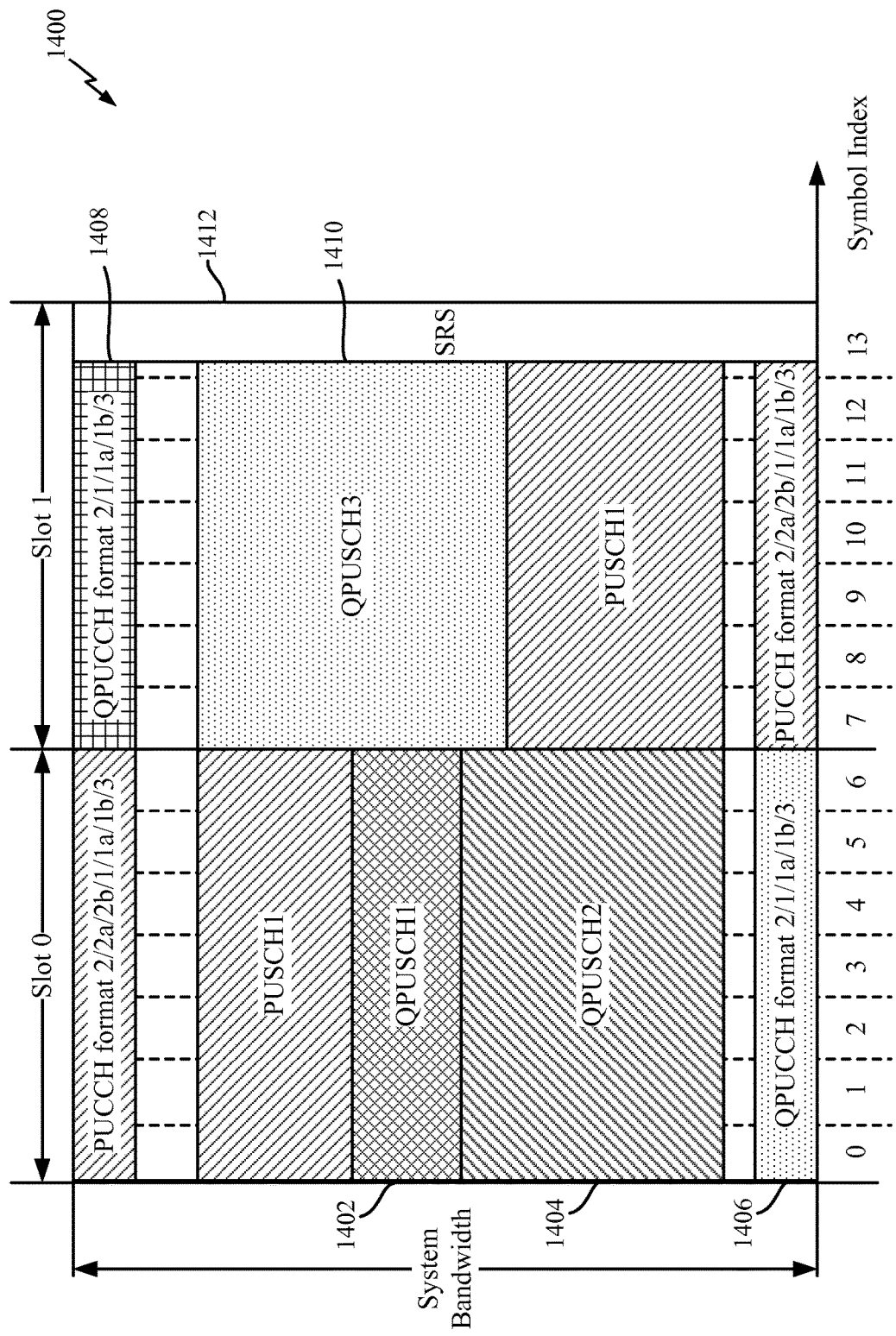
FIG. 14 is a diagram illustrating an example low latency uplink channel design, in accordance with aspects of the present disclosure.

FIG. 14 illustrates an example uplink control channel design for an uplink subframe 1400 using a reduced TTI that may be used by a UE and/or an eNB to perform low latency communications (e.g., in accordance with the operations 1200 and/or 1300 described above).

For example, as shown in FIG. 14, to support LL communications and backward compatibility, control and data channel resource element blocks for quick physical uplink control channels (QPUCCHs) and/or quick physical uplink shared channels (QPUSCHs) may be placed into each slot of the uplink subframe 1400, thus reducing the TTI to one time slot (e.g., 0.5 ms), rather than to one subframe (e.g., 1 ms). For example, as illustrated in FIG. 14, Slot 0 comprises QPUSCH1 at 1402, QPUSCH2 at 1404, and QPUCCH at 1406. Additionally, Slot 1 comprises QPUCCH at 1408 and QPUSCH3 at 1410.

According to certain aspects, the 0.5 ms-TTI QPUCCH (e.g., at 1406 and/or 1408) may be based on a legacy PUCCH format (e.g., one of formats 2/2a/2b/1/1a/1b/3). In some cases, each slot of the uplink subframe 1400 may use a different format. For example, Slot 0 may use a full length format, while Slot 1 may use a shortened format (e.g., due to an SRS region 1412). In some cases, since formats 2a and 2b rely on the difference between pilots in two slots for signaling ACK bits, a slot based PUCCH using format 2a and 2b may not be supported.

Additionally, QPUCCH may use the same frequency location as legacy PUCCH. QPUCCH in different slots may use different RBs and LL UE may use either slot 0 or slot 1 (but in some cases, not both). In some cases, there may be no hopping from the perspective of a UE that supports LL communications. Group hopping and sequence hopping may also be supported for QPUCCH in the same way as legacy PUCCH, but may only use one slot instead of two. According to certain aspects, if group/sequence hopping is being used for LL communications, the LL UE may follow the same group/sequence determination as legacy UEs.

As described above, QPUCCH may be based on legacy PUCCH formats/structures. For example, for formats 1, 1a, 1b, and 2, the QPUCCH may use the same structure as the legacy PUCCH, but may only span a single slot duration. Additionally, for different formats, there may exist different options for implementing the QPUCCH. For example, for format 3, the QPUCCH may (1) be based on the same structure as the legacy PUCCH, but may only span a single slot structure. Additionally, another way to support QPUCCH using format 3 may be to extend the one RB design to a two RB design with the same code rate and resource mapping. For example, Inverse Discrete Fourier Transform (IDFT) may be performed over 2 RB instead of 1 RB. Another option is to perform a different coding for PUCCH format 3 to take into account the fact that only half of the coded bits are available in one slot.

In some cases, QPUCCH may not support certain existing legacy PUCCH formats. For example, format 2a/2b may not be supported. Instead a new mapping rule may be defined such that if information is to be sent using formats 2a or 2b the information may be mapped and sent on format 3 with a single slot duration. For example, the UE may send ACK with CQI, using format 3 instead of format 2a/2b.

Additionally, as illustrated in FIG. 14, QPUSCH for different UEs may be multiplexed in each slot. For example, as illustrated, QPUSCH1 at 1402 and QPUSCH2 at 1404 corresponding to two UEs may be multiplexed into Slot 0, while QPUSCH3 at 1410 corresponding to a third user may be multiplexed into Slot 1. In certain aspects, group and sequence hopping may be supported, as well as uplink control information (UCI) on PUSCH.

Figure 15:
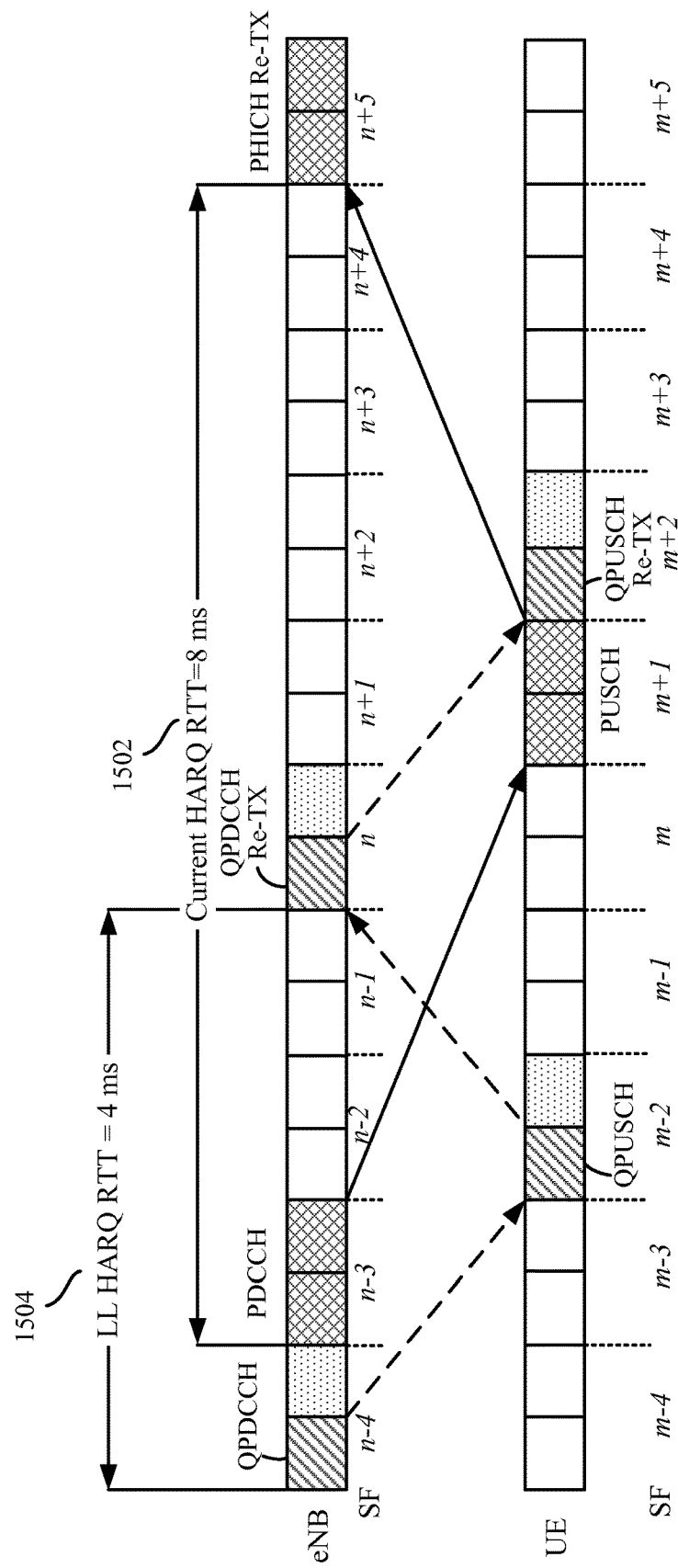
FIG. 15 is a diagram illustrating example uplink Hybrid Automatic Repeat Request (HARQ) transmissions, in accordance with aspects of the present disclosure.

As illustrated in FIG. 15, according to certain aspects, the reduced TTIs (i.e., reduced to 0.5 ms) proposed herein may allow HARQ round trip times (RTTs) to also be reduced. For example, reduced TTIs may allow for reduced UL HARQ RTTs.

In legacy LTE design, the physical hybrid indicator channel (PHICH) resource (carrying ACK/NACK) in subframe n is mapped to a PUSCH transmission from subframe n−4 (4 ms prior to the subframe with PHICH). Moreover, the PUSCH (being ACK'd) is also mapped to a PDCCH4 subframes prior to the PUSCH. For example, as illustrated in FIG. 15, the PHICH transmitted in subframe SF n+5 is mapped to (and carries an ACK for) the PUSCH transmitted in subframe SF m+1 which, in turn, is mapped to the PDCCH transmitted in subframe SF n−3 (e.g., that provided the grant for the PUSCH). Thus, as illustrated, the HARQ RTT for legacy communications 1502 may be 8 ms (i.e., the time from when the PDCCH schedules the UL HARQ transmission to when that UL HARQ transmission is acknowledged).

According to certain aspects, however, using the QPDCCH and QPUSCH presented herein, UL HARQ RTT may be reduced, for example, from 8 ms to 4 ms. For example, as illustrated in FIG. 15, this reduced RTT 1504 may result from the QPUSCH transmission (transmitted in a first slot of subframe m−2) being ACK'd via a QPDCCH (transmitted in a first slot of subframe n). Further, as illustrated, the QPUSCH may be scheduled via a QPDCCH sent in a first slot of subframe n−4).

Figure 16:
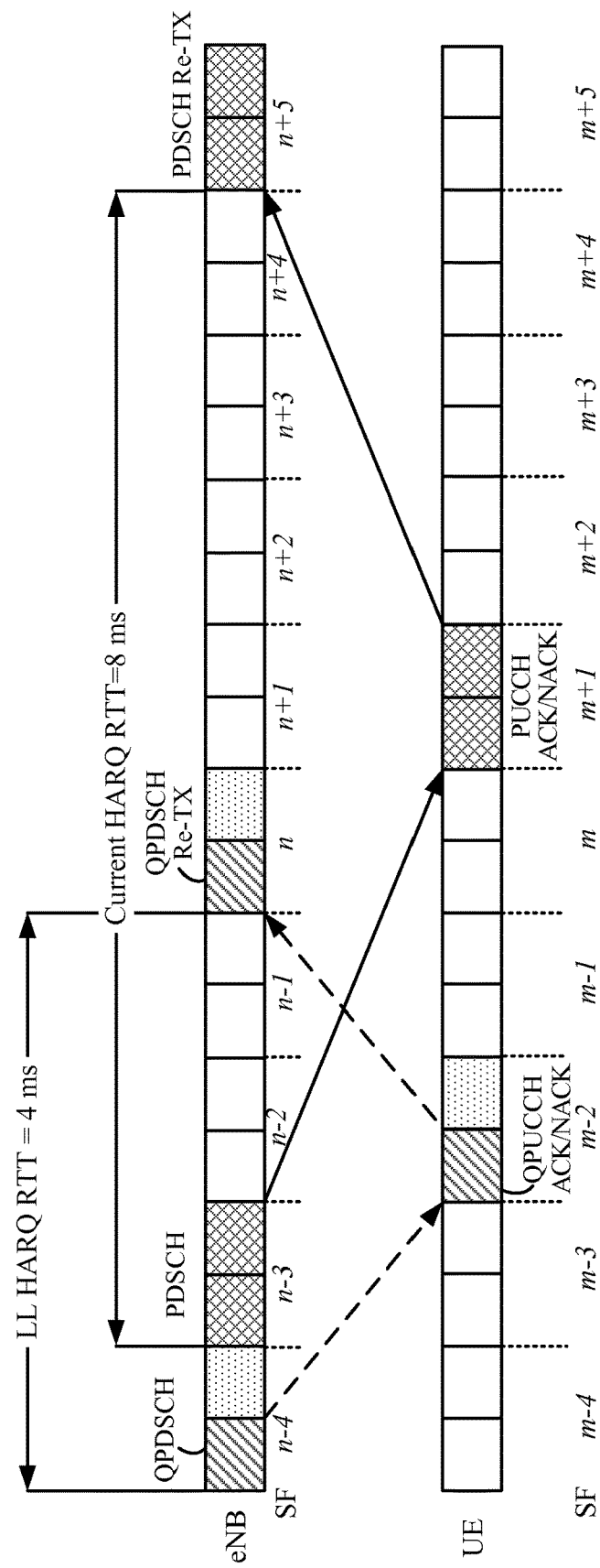
FIG. 16 is a diagram illustrating example downlink Hybrid Automatic Repeat Request (HARQ) transmissions, in accordance with aspects of the present disclosure.

Similarly, as illustrated in FIG. 16, reduced TTIs may also allow for reduced DL HARQ RTTs. In legacy LTE design, a PDSCH transmission (sent in subframe n−3) is ACK'd via a PUCCH transmission in subframe m+1. Further, the retransmission of PDSCH occurs in subframe n+5, again resulting in a HARQ RTT of 8 ms.

According to certain aspects, however, using the QPDCCH and QPUSCH presented herein, may reduce the DL HARQ RTT, for example, from 8 ms to 4 ms. As illustrated in FIG. 16, this reduced RTT result from the QPDSCH transmission (transmitted in a first slot of subframe n−4) being ACK'd via a QPUCCH (transmitted in a first slot of subframe m−2). Further, as illustrated, the QPDSCH may be retransmitted in a first slot of subframe n).

As discussed above, legacy PUCCH ACKs may be mapped to DL assignments that occurred 4 ms prior to the PUCCH ACK. As a result, for LL HARQ RTTs of 2 ms, it may be possible that QPUCCH ACK resources (mapped to 2 ms before the QPUCCH ACK) may collide with some legacy UEs PUCCH ACK resources. Thus, certain aspects of the present disclosure provide solutions for avoiding a possible collision between QPUCCH and PUCCH resources.

For example, one option to prevent collision between QPUCCH and PUCCH resources may be to design a new mapping rule for LL ACK having 2 ms turnaround (not shown in Figure). Another option to prevent collision between QPUCCH and PUCCH collision may be for an eNB to schedule downlink data transmissions for legacy UEs and LL UEs in a manner designed to avoid collisions. In both options, slot-based PUCCH transmissions may be mapped to slot-based DL assignments. From the LL UE's perspective, using same frequency resources across slots may appear as if no hopping is being used. In some cases, the QPUCCH may use the same frequency location as the legacy PUCCH. For example, Slot 0 and Slot 1 may use different resource blocks and LL UEs may use either Slot 0 or Slot 1.

According to certain aspects collisions on resources used to ACK uplink transmissions may also be avoided by applying similar techniques as presented above for preventing collision between QPUCCH and PUCCH resources.

Certain aspects of the present disclosure provide LL UL data channel transmissions via QPUSCH and sounding reference signal (SRS) multiplexing. For example, the QPUSCH may be designed for slot level transmission with one DMRS symbol. For example, frequency tracking loop may rely on either receiver implementation.

In certain aspects, QPUSCH may be designed to comprise 2 DMRS symbols, for example, by reusing the structure of PUCCH format 2. According to certain aspects, a QPUSCH with 2 DRMS symbols may have to use a shortened pilot.

Additionally, according to certain aspects, for QPUSCH, slot hopping may also be allowed which may be conceptually similar to current inter-subframe hopping.

According to certain aspects, for shortened format and SRS transmissions, PUSCH and PUCCH shortened formats may be supported to allow multiplexing with legacy transmissions. In some cases, SRS transmissions may be supported only in Slot 1.

Certain aspects of the present disclosure also provide for uplink control information (UCI) handling. For example, UCI may be sent on PUSCH to maintain single carrier-frequency division multiplexing (SC-FDM). Similar rules as legacy LTE design may be used to determine when to drop certain transmissions, for example, based on channel priority. In addition, similar resource determination for LL UCI may be used on PUSCH. For example, a similar number of resources may be kept if PUSCH assignment doubles in RBs with one slot assignment. In some cases, a new parameter ($\alpha'$) may be used for ACK, rank indicator (RI), and CQI resource determination to allow for better optimization.

Certain aspects of the present disclosure provide methods for multiplexing CQI with slot-based PUSCH. For example, CQI may be multiplexed on 1-slot PUSCH. In certain aspects, a 1 ms CQI may be used when in fall back mode with 1 ms TTI.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures (e.g., FIGS. 7 and/or 8), those operations may be performed by any suitable corresponding counterpart means plus function components. For example, means for providing, means for receiving, means for transmitting/retransmitting, means for performing, means for demodulating, means for allocating, means for determining, means for participating, and/or means for scheduling may comprise one or more transmitters/receivers (e.g., TX/RX 618 and/or RX/TX 654) and/or one or more processors (e.g., TX Processor 616/618, RX Processor 670/656, and/or Controller/Processor 675/658).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, PCM (phase change memory), ROM memory, EPROM memory, EEPROM memory, registers, hard disk, a removable disk, a CD ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c, and any combination of any number of a, b, or c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   providing, to a base station, an indication that the UE is capable of supporting communications according to a shorter transmission time interval (TTI) through one or more quick uplink channels; and
   transmitting a quick physical uplink control channel (QPUCCH) in a slot of a subframe, wherein:
      the QPUCCH has a duration of one slot of the subframe;
      the QPUCCH has a bandwidth narrower than a system bandwidth;
      the QPUCCH is formatted based on a legacy physical uplink control channel format; and
      the legacy physical uplink control channel format is selected based on whether the QPUCCH is transmitted during a first slot or a second slot of the subframe.

2. The method of claim 1, further comprising: performing one or more procedures in accordance with a longer TTI, wherein the one or more procedures comprise at least one of: a cell search, system information block (SIB) detection, a random access channel (RACH) procedure, page detection, or an idle mode procedure.

3. The method of claim 1, further comprising:
   in response to providing the indication, receiving parameters from the base station for performing the communications according to the shorter TTI,
   wherein the parameters indicate at least one of time resources for the one or more quick uplink channels, frequency resources for the one or more quick uplink channels, or a mapping of downlink transmissions to resources for use in acknowledging the downlink transmissions using the one or more quick uplink channels.

4. The method of claim 1, wherein:
   selecting the legacy physical uplink control channel format from:
      a first set of physical uplink control channel (PUCCH) formats, for transmitting uplink control information, which are supported in the first slot of the subframe; and
      a second set of PUCCH formats, which are supported in the second slot of the subframe,
      wherein the second set is a reduced subset of the first set.

5. The method of claim 1, wherein:
   receiving, from the base station, a first allocation of a first set of resource blocks (RBs) for transmitting the QPUCCH in the first time slot of the subframe; and
   receiving, from the base station, a second allocation of a second set of RBs, different from the first set of RBs, for transmitting a second quick physical uplink control channel in the second time slot of the subframe.

6. The method of claim 1, further comprising:
   transmitting data in a quick physical uplink shared channel (QPUSCH) in the first slot or the second slot of the subframe; and
   receiving an indication of whether the data transmitted in the QPUSCH was successfully received by the base station in a quick physical downlink control channel (QPDCCH) transmitted from the base station in accordance with the shorter TTI.

7. The method of claim 1, further comprising: receiving data in a quick physical downlink shared channel (QPDSCH) transmitted from the base station in accordance with the shorter TTI.

8. The method of claim 7, further comprising: transmitting an indication of whether the QPDSCH transmission was successfully received in a second quick physical uplink control channel (QPUCCH).

9. The method of claim 8, wherein the second QPUCCH is transmitted in a different subframe after receiving the QPDSCH transmission in accordance with the shorter TTI.

10. The method of claim 1, further comprising: transmitting at least one of a quick physical uplink shared channel (QPUSCH) or the QPUCCH in the first slot or the second slot of the subframe multiplexed with sounding reference signals (SRS).

11. The method of claim 1, further comprising: transmitting a channel quality indicator (CQI) in a quick physical uplink shared channel (QPUSCH) in the first slot or the second slot of the subframe.

12. An apparatus for wireless communications by a user equipment (UE), comprising a memory coupled with at least one processor, wherein the at least one processor is configured to:
provide, to a base station, an indication that the UE is capable of supporting communications according to a shorter transmission time interval (TTI) through one or more quick uplink channels; and
transmit a quick physical uplink control channel (QPUCCH) in a slot of a subframe, wherein:
the QPUCCH has a duration of one slot of the subframe;
the QPUCCH has a bandwidth narrower than a system bandwidth;
the QPUCCH is formatted based on a legacy physical uplink control channel format; and
the legacy physical uplink control channel format is selected based on whether the QPUCCH is transmitted during a first slot or a second slot of the subframe.

13. The apparatus of claim 12, wherein the at least one processor is further configured to: perform one or more procedures in accordance with a longer TTI, wherein the one or more procedures comprise at least one of: a cell search, system information block (SIB) detection, a random access channel (RACH) procedure, page detection, or an idle mode procedure.

14. The apparatus of claim 12, wherein the at least one processor is further configured to:
in response to the provided indication, receive parameters from the base station for performing the communications according to the shorter TTI,
wherein the parameters indicate at least one of time resources for the one or more quick uplink channels, frequency resources for the one or more quick uplink channels, or a mapping of downlink transmissions to resources for use in acknowledging the downlink transmissions using the one or more quick uplink channels.

15. The apparatus of claim 12, wherein the at least one processor is further configured to:
select the legacy physical uplink control channel format from:
a first set of physical uplink control channel (PUCCH) formats, for transmitting uplink control information, which are supported in the first slot of the subframe; and
a second set of PUCCH formats, which are supported in the second slot of the subframe,
wherein the second set is a reduced subset of the first set.

16. The apparatus of claim 12, wherein the at least one processor is further configured to:
receive, from the base station, a first allocation of a first set of resource blocks (RBs) for transmitting the QPUCCH in the first time slot of the subframe; and
receive, from the base station, a second allocation of a second set of RBs, different from the first set of RBs, for transmitting a second quick physical unlink control channel in the second time slot of the subframe.

17. The apparatus of claim 12, wherein the at least one processor is further configured to:
transmit data in a quick physical uplink shared channel (QPUSCH) in the first slot or the second slot of the subframe; and
receive an indication of whether the data transmitted in the QPUSCH was successfully received by the base station in a quick physical downlink control channel (QPDCCH) transmitted from the base station in accordance with the shorter TTI.

18. The apparatus of claim 12, wherein the at least on processor is further configured to: receive data in a quick physical downlink shared channel (QPDSCH) transmitted from the base station in accordance with the shorter TTI.

19. The apparatus of claim 18, wherein the at least one processor is configured to: transmit an indication of whether the QPDSCH transmission was successfully received in a second quick physical uplink control channel (QPUCCH).

20. The apparatus of claim 19, wherein the second QPUCCH is transmitted in a different subframe after receiving the QPDSCH transmission in accordance with the shorter TTI.

21. The apparatus of claim 12, wherein the at least one processor is configured to: transmit at least one of a quick physical uplink shared channel (QPUSCH) or the QPUCCH in the first slot or the second slot of the subframe multiplexed with sounding reference signals (SRS).

22. The apparatus of claim 12, wherein the at least one processor is configured to: transmit a channel quality indicator (CQI) in a quick physical uplink shared channel (QPUSCH) in the first slot or the second slot of the subframe.

23. An apparatus for wireless communications by a user equipment (UE), comprising:
means for providing, to a base station, an indication that the UE is capable of supporting communications according to a shorter transmission time interval (TTI) through one or more quick uplink channels; and
means for transmitting a quick physical uplink control channel (QPUCCH) in a slot of a subframe, wherein:
the QPUCCH has a duration of one slot of the subframe;
the QPUCCH has a bandwidth narrower than a system bandwidth;
the QPUCCH is formatted based on a legacy physical uplink control channel format; and
the legacy physical uplink control channel format is selected based on whether the QPUCCH is transmitted during a first slot or a second slot of the subframe.

24. The apparatus of claim 23, further comprising:
means for selecting the legacy physical uplink control channel format from:
a first set of physical uplink control channel (PUCCH) formats, for transmitting uplink control information, which are supported in the first slot of the subframe; and a second set of PUCCH formats, which are supported in the second slot of the subframe, wherein the second set is a reduced subset of the first set.

25. A non-transitory computer-readable medium for wireless communications by a user equipment (UE), comprising instructions that, when executed by at least one processor, cause the at least one processor to:

provide, to a base station, an indication that the UE is capable of supporting communications according to a shorter transmission time interval (TTI) through one or more quick uplink channels; and transmit a quick physical uplink control channel (QPUCCH) in a slot of a subframe, wherein:

the QPUCCH has a duration of one slot of the subframe;

the QPUCCH has a bandwidth narrower than a system bandwidth;

the QPUCCH is formatted based on a legacy physical uplink control channel format; and the legacy physical uplink control channel format is selected based on whether the QPUCCH is transmitted during a first slot or a second slot of the subframe.

26. The non-transitory computer-readable medium of claim 25, comprising further instructions that, when executed by the at least one processor, cause the at least one processor to:

select the legacy physical uplink control channel format from:

a first set of physical uplink control channel (PUCCH) formats, for transmitting uplink control information, which are supported in the first slot of the subframe; and a second set of PUCCH formats are supported in the second slot of the subframe, wherein the second set is a reduced subset of the first set.

* * * * *